US012598319B2

(12) United States Patent
Klaba et al.

(10) Patent No.: US 12,598,319 B2
(45) Date of Patent: Apr. 7, 2026

(54) METHODS AND SYSTEMS FOR STORING AERIAL IMAGES ON A DATA STORAGE DEVICE

(71) Applicant: OVH, Roubaix (FR)

(72) Inventors: Octave Klaba, Roubaix (FR);
Miroslaw Piotr Klaba, Roubaix (FR)

(73) Assignee: OVH, Roubaix (FR)

( * ) Notice: Subject to any disclaimer, the term of this patent is extended or adjusted under 35 U.S.C. 154(b) by 146 days.

(21) Appl. No.: 18/545,212

(22) Filed: Dec. 19, 2023

(65) Prior Publication Data

US 2024/0214598 A1 Jun. 27, 2024

(30) Foreign Application Priority Data

Dec. 22, 2022 (EP) .................................... 22307011

(51) Int. Cl.
H04N 19/48 (2014.01)
G06T 7/174 (2017.01)
(Continued)

(52) U.S. Cl.
CPC ............. H04N 19/48 (2014.11); G06T 7/174 (2017.01); G06T 7/38 (2017.01); G06V 10/761 (2022.01);
(Continued)

(58) Field of Classification Search
CPC ........... H04N 19/48; G06T 7/174; G06T 7/38; G06T 2207/10016; G06T 2207/10032;
(Continued)

(56) References Cited

U.S. PATENT DOCUMENTS 8,019,167 B2 9/2011 Dvir et al.
8,270,303 B2 9/2012 Sauerwein et al.
(Continued)

FOREIGN PATENT DOCUMENTS

CN 113240761 A 8/2021
CN 113722518 A 11/2021
CN 114003755 B 10/2022

OTHER PUBLICATIONS

Search Report with regard to European Patent Application No. 22307011.1 completed on May 4, 2023.
(Continued)

*Primary Examiner* — Girumsew Wendmagegn
(74) *Attorney, Agent, or Firm* — BCF LLP

(57) ABSTRACT

System and method for storing a captured aerial image on a data storage device, the captured aerial image being associated with a corresponding metadata file. The method including accessing the captured aerial image and the corresponding metadata file, extracting a sequence of stored aerial images from a compressed file stored on the data storage device, the sequence of stored aerial images comprising at least one stored aerial image, determining a first position for inserting the captured aerial image in the sequence of stored aerial images, updating the sequence of stored aerial images by inserting the captured aerial image in the sequence of stored aerial images at the first position, updating the compressed file by applying an encoding algorithm to the sequence of stored aerial images and storing the compressed file on the data storage device.

18 Claims, 13 Drawing Sheets

(51) Int. Cl.

| | |
|---|---|
| *G06T 7/38* | (2017.01) |
| *G06V 10/74* | (2022.01) |
| *G06V 20/13* | (2022.01) |
| *G06V 20/17* | (2022.01) |
| *G06V 20/40* | (2022.01) |

(52) U.S. Cl.
CPC .............. *G06V 20/13* (2022.01); *G06V 20/17* (2022.01); *G06V 20/46* (2022.01); *G06T 2207/10016* (2013.01); *G06T 2207/10032* (2013.01); *G06V 2201/10* (2022.01)

(58) Field of Classification Search
CPC ........ G06T 9/00; G06V 10/761; G06V 20/13; G06V 20/17; G06V 20/46; G06V 2201/10; G06F 16/587; G06F 16/51; G06F 3/0643
See application file for complete search history.

(56) References Cited

U.S. PATENT DOCUMENTS

| | | | |
|---|---|---|---|
| 8,477,188 | B2 | 7/2013 | Mcdonald et al. |
| 8,587,651 | B2 | 11/2013 | Mcdonald et al. |
| 8,644,690 | B2 | 2/2014 | Ernst et al. |
| 8,659,662 | B2 | 2/2014 | Mcdonald et al. |
| 8,692,885 | B2 | 4/2014 | Sartor et al. |
| 8,717,436 | B2 | 5/2014 | Heminghous et al. |
| 8,928,751 | B2 | 1/2015 | Antikidis et al. |
| 8,933,961 | B2 | 1/2015 | Mcdonald et al. |
| 8,955,031 | B2 | 2/2015 | Basso et al. |
| 9,288,513 | B2 | 3/2016 | Omer et al. |
| 9,313,242 | B2 | 4/2016 | Mann |
| 9,684,673 | B2 | 6/2017 | Beckett et al. |
| 9,936,214 | B2 | 4/2018 | Loyd et al. |
| 9,996,976 | B2 | 6/2018 | Zhou et al. |
| 10,341,684 | B2 | 7/2019 | Drako |
| 10,412,420 | B2 | 9/2019 | Drako et al. |
| 10,798,342 | B2 | 10/2020 | Drako et al. |
| 11,429,658 | B1 * | 8/2022 | Richter ................. G06F 16/483 |
| 2005/0213147 | A1 * | 9/2005 | Minatogawa ........... G06F 16/50 |
| | | | 358/1.15 |
| 2011/0234796 | A1 | 9/2011 | Taber |
| 2013/0027555 | A1 | 1/2013 | Meadow |
| 2013/0330020 | A1 | 12/2013 | Thakkar et al. |
| 2018/0249168 | A1 | 8/2018 | Loyd et al. |
| 2021/0398322 | A1 | 12/2021 | Morgan et al. |
| 2022/0197893 | A1 * | 6/2022 | Rauhala ................. G06V 20/17 |

OTHER PUBLICATIONS

"ImageMagick", retrieved on https://imagemagick.org/index.php on Dec. 19, 2023, pdf 2 pages.

* cited by examiner

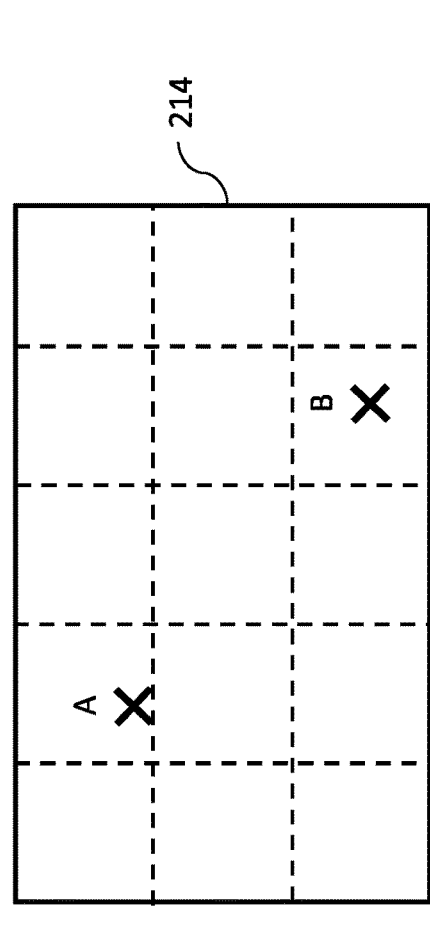
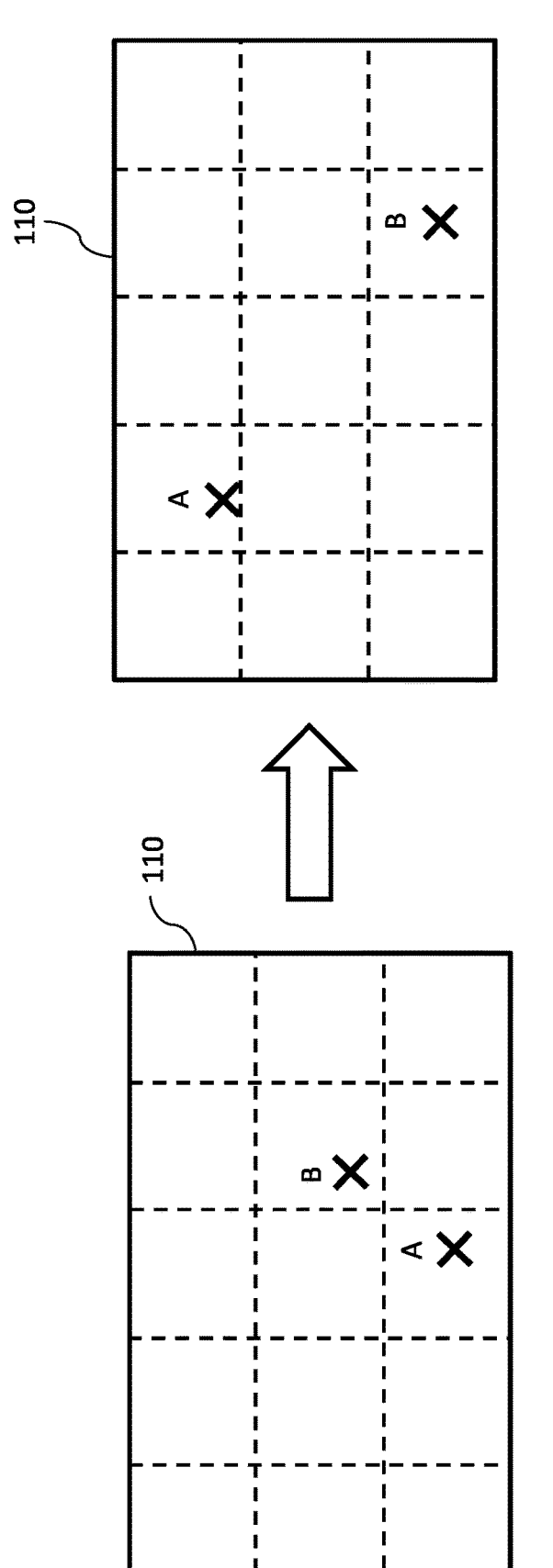
Figure 9

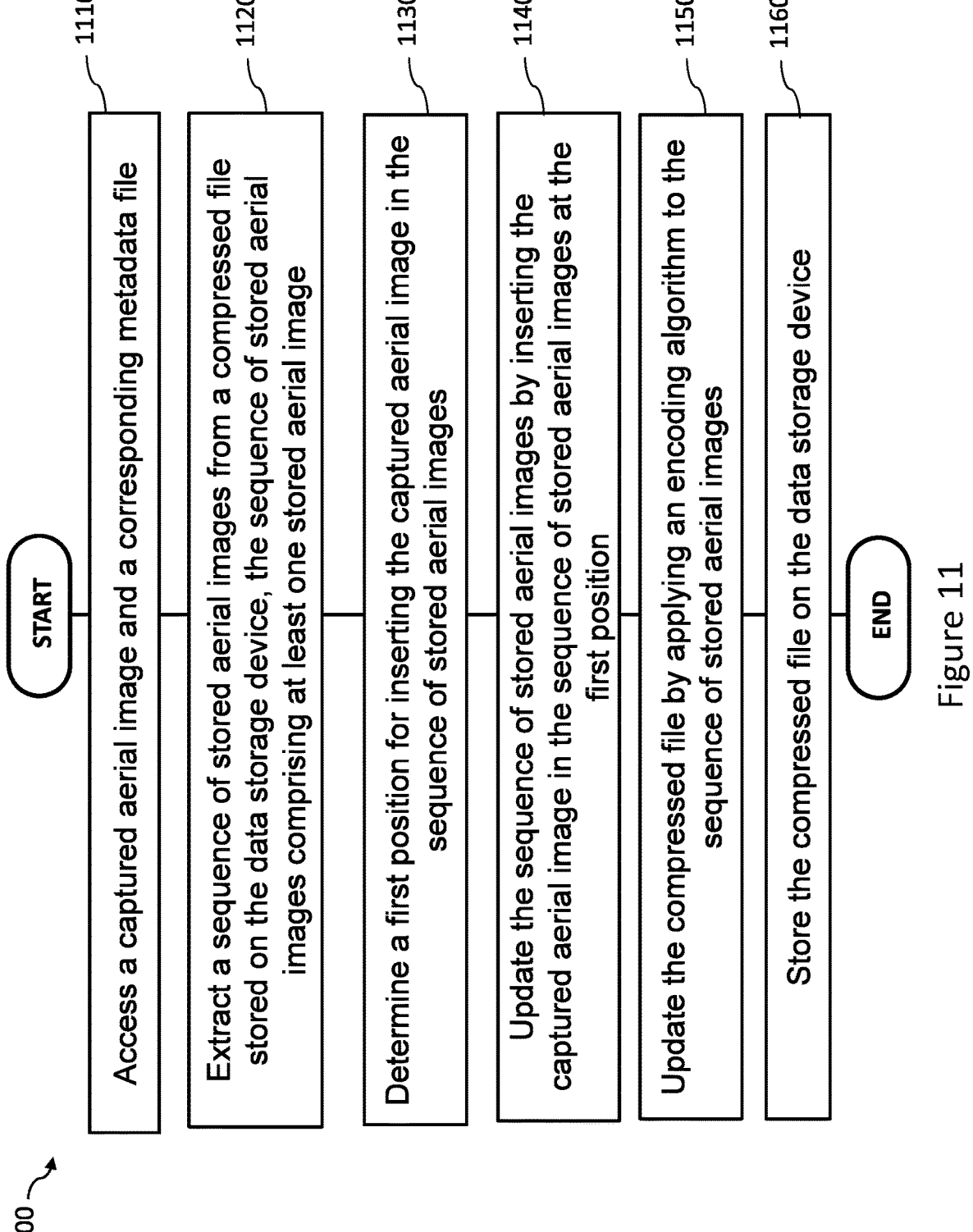

1100

1110 — START

Access a captured aerial image and a corresponding metadata file

1120 — Extract a sequence of stored aerial images from a compressed file stored on the data storage device, the sequence of stored aerial images comprising at least one stored aerial image 1130 — Determine a first position for inserting the captured aerial image in the sequence of stored aerial images 1140 — Update the sequence of stored aerial images by inserting the captured aerial image in the sequence of stored aerial images at the first position 1150 — Update the compressed file by applying an encoding algorithm to the sequence of stored aerial images 1160 — Store the compressed file on the data storage device

END

Figure 11

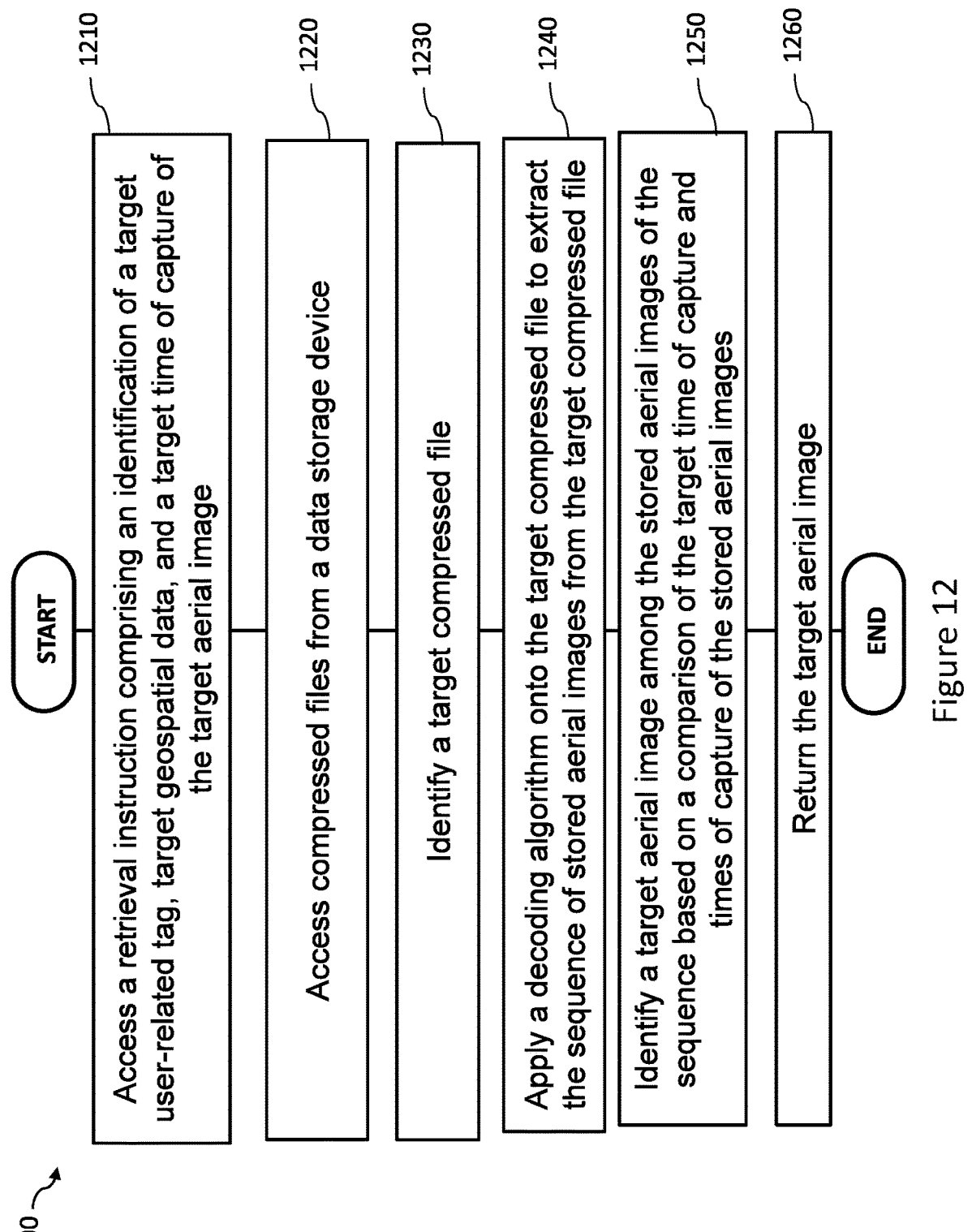

START

1210 Access a retrieval instruction comprising an identification of a target user-related tag, target geospatial data, and a target time of capture of the target aerial image 1220 Access compressed files from a data storage device 1230 Identify a target compressed file 1240 Apply a decoding algorithm onto the target compressed file to extract the sequence of stored aerial images from the target compressed file 1250 Identify a target aerial image among the stored aerial images of the sequence based on a comparison of the target time of capture and times of capture of the stored aerial images 1260 Return the target aerial image

END

METHODS AND SYSTEMS FOR STORING AERIAL IMAGES ON A DATA STORAGE DEVICE

CROSS-REFERENCE TO RELATED APPLICATIONS

The present application claims priority to European Patent Application No. 22307011.1 titled "METHODS AND SYSTEMS FOR STORING AERIAL IMAGES ON A DATA STORAGE DEVICE", filed Dec. 22, 2022, the entirety of which is incorporated by reference herein.

FIELD OF TECHNOLOGY

The present technology generally relates to methods and systems for data compression and, more specifically, for storing aerial images on a data storage device.

BACKGROUND

Recent developments in the field of imaging systems and the increasing demand for images (e.g. used as inputs of machine learning models) have led to increasing demand for data storage optimisation. For example, in the context of satellite imagery, the use of optic-based transfer systems for the transfer of information enables large amount of data to be efficiently transmitted to cloud-based environments for storage of said information.

Typical image compression techniques may be used to reduce storage space required to store a given data object (e.g. a two dimensional image). However, in the context of satellite imagery, the relative high quantity of data objects may outreach the benefits of said image compression techniques. As a result, any optimisation for storage of data objects is desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approach.

SUMMARY

It is an object of the present technology to ameliorate at least some of the inconveniences present in the prior art.

In particular, shortcomings of the prior art may comprise (1) inefficient storage of aerial images; and/or (2) inability to orchestrate multi-tenant data storage device for storing aerial images.

In a first broad aspect of the present technology, there is provided a method for storing a captured aerial image on a data storage device, the captured aerial image being associated with a corresponding captured aerial image metadata file, the method comprising:
- accessing the captured aerial image and the corresponding captured aerial image metadata file, the captured aerial image metadata file comprising captured geospatial data indicative of a location of a first zone of interest imaged on the captured aerial image;
- selecting a compressed file among a plurality of compressed files in response to the first zone of interest imaged on the captured aerial image overlapping at least a portion of the first zone of interest imaged in the compressed file;
- extracting a first sequence of stored aerial images from the selected compressed file stored on the data storage device, the first sequence of stored aerial images comprising at least one stored aerial image, and the selected compressed file being associated with a corresponding stored aerial image metadata file, the stored aerial image metadata file comprising stored geospatial data indicative of a location of a corresponding first zone of interest imaged in the selected compressed file;
- determining a first position for inserting the captured aerial image in the first sequence of stored aerial images;
- updating the first sequence of stored aerial images by inserting the captured aerial image in the first sequence of stored aerial images at the first position;
- after updating the first sequence of stored aerial images, encoding the selected compressed file by applying an encoding algorithm to the first sequence of stored aerial images; and
- storing the selected compressed file on the data storage device.

In some implementations of the method, the selected compressed file is a first compressed file, the captured geospatial data is further indicative of a location of a second zone of interest imaged in the captured aerial image and the method further comprises:
- generating a synthesis aerial image from the captured aerial image, the synthesis aerial image comprising the second zone of interest imaged in the captured aerial image;
- generating a synthesis aerial image metadata file corresponding to the synthesis aerial image;
- selecting a second compressed file among the plurality of compressed files based on the synthesis aerial image metadata file;
- extracting a second sequence of stored aerial images from the second compressed file;
- determining a second position for inserting the synthesis aerial image in the second sequence of stored aerial images;
- updating the second sequence of stored aerial images by inserting the synthesis aerial image in the second sequence of stored aerial images at the second position;
- after updating the second sequence of stored aerial images, encoding the second compressed file by applying the encoding algorithm to the second sequence of stored aerial images; and
- storing the second compressed file onto the data storage device.

In some implementations of the method, the method further comprising, subsequent to extracting the first sequence of stored aerial images:
- determining, based on the captured aerial image and a given stored aerial image of the sequence of stored aerial images, a first set of coordinates of a first entity and a second set of coordinates of a second entity, the first and second entities being imaged on both of the captured aerial image and the given stored aerial image; and
- performing image processing operations onto the captured aerial image to form an aligned version of the captured aerial image,
- wherein the updating the sequence of stored aerial images by inserting the captured aerial image in the sequence of stored aerial images comprises inserting the aligned version of the captured aerial image.

In some implementations of the method, the compressed file is a video file, each stored aerial image constitutes a frame of the video file, and the encoding algorithm is a video encoding algorithm.

In some implementations of the method, the compressed file is an image file, the compressed file comprising information of an image concatenation of a plurality of concatenated stored aerial images, and the encoding algorithm is an image encoding algorithm.

In some implementations of the method, determining the first position of the captured aerial image in the sequence of stored aerial images comprises:

determining, for each of the at least one stored aerial image of the first sequence of stored aerial images, a similarity score indicative of a visual similarity between the captured aerial image and a corresponding stored aerial image of the first sequence of stored aerial images; and defining the first position adjacent to a given one of the stored aerial image of the first sequence of stored aerial images having the highest similarity score.

In some implementations of the method, determining the similarity score for each of the at least one stored aerial image of the first sequence of stored aerial images comprises:

accessing downgraded versions of each of the at least one stored aerial image of the sequence of stored aerial images; and for each stored aerial image of the first sequence of stored aerial images, determining the similarity score based on a visual similarity between the corresponding downgraded version and the captured aerial image.

In some implementations of the method, the data storage device is a multi-tenant data storage device communicably connected with a plurality of users, the metadata file corresponding to each of the at least one compressed file comprising a user-related tag being indicative of an identification of a corresponding one user of the plurality of users.

In some implementations of the method, the captured aerial image metadata file comprises a first user-related tag indicative of an identification of a first user; and wherein selecting the compressed file among the plurality of compressed files comprises:

accessing the metadata file of the at least one compressed file, each metadata file of the at least one compressed file comprising a user-related tag indicative of an identification of at least one user having access rights to the corresponding compressed file; and selecting the compressed file among the plurality of compressed files based on a matching of the first user-related tag with the user-related tags of the at least one compressed file.

In some implementations of the method, selecting the compressed file among the plurality of compressed files comprises:

determining a first set of compressed files based on a matching of the first user-related tag with the user-related tags of the at least one compressed file; and selecting the compressed file among the first set of compressed files.

In some implementations of the method, the method further comprises:

receiving instruction from a user to retrieve a target aerial image from the data storage device, the instruction comprising an identification of a target user-related tag and a target temporal tag;

identifying a target compressed file based on the identification of the target user-related tag;

extracting the target aerial image from the sequence of stored aerial images of the target compressed file based on the target temporal tag; and transmitting the target aerial image to the user.

In some implementations of the method, the method further comprises prior to extracting the sequence from the compressed file, selecting the compressed file among the plurality of compressed files stored on the data storage device based on the metadata file corresponding to the captured image and on a metadata file corresponding to the compressed file.

In some implementations of the method, the method further comprises subsequent to storing the compressed file on the data storage device, updating a metadata file of the compressed file based on information included in the metadata file corresponding to the captured aerial image.

In some implementations of the method, the image processing operations are selected in a group of operations including zooming operations, cropping operations and rotation operations.

In some implementations of the method, the video encoding algorithm uses a High Efficiency Video Coding (HEVC) compression standard and the captured aerial image is a satellite image.

In a second broad aspect of the present technology, there is provided a method for retrieving a target aerial image from a data storage device, the data storage device storing compressed files, the method being executable by a server. The method includes accessing a retrieval instruction including an identification of a target user-related tag, target geospatial data, and a target time of capture of the target aerial image, and accessing the compressed files from the data storage device, each of the compressed files being a compressed form of a sequence of stored aerial images and being associated with a metadata file. The metadata file includes a user-related tag indicative of an identification of at least one user having access rights, stored geospatial data indicative of a location of a corresponding zone of interest imaged, and indication of times of capture. The method also includes identifying a target compressed file from the compressed files, the identifying being based on at least one of a comparison of the target user-related tag with the user-related tag of each the compressed files and a comparison of the target geospatial data and the stored geospatial data of each the compressed files. The method also includes applying a decoding algorithm onto the target compressed file to extract the sequence of stored aerial images from the target compressed file, identifying the target aerial image among the stored aerial images of the sequence based on a comparison of the target time of capture and times of capture of the stored aerial images and returning the target aerial image.

In some implementations of the method, accessing the retrieval instruction includes receiving, by the server from a user device communicably connected thereto, the retrieval instruction.

In a third broad aspect of the present technology, there is provided a computer-implemented system, the system including a controller and a memory storing a plurality of executable instructions which, when executed by the controller, cause the system to perform the methods.

In a fourth broad aspect of the present technology, there is provided a non-transitory computer-readable medium comprising computer-readable instructions that, upon being executed by a system, cause the system to perform the methods.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 9 is a schematic representation of image processing operations applied the server of FIG. 1 to a captured aerial image in accordance with non-limiting implementations of the present technology;

FIG. 11 illustrates a flow diagram showing operations of a method for storing a captured aerial image on a data storage device in accordance with non-limiting examples of the present technology;

FIG. 12 illustrates a flow diagram showing operations of a method for retrieving a stored aerial image from a data storage device in accordance with non-limiting examples of the present technology.

Figure 1:
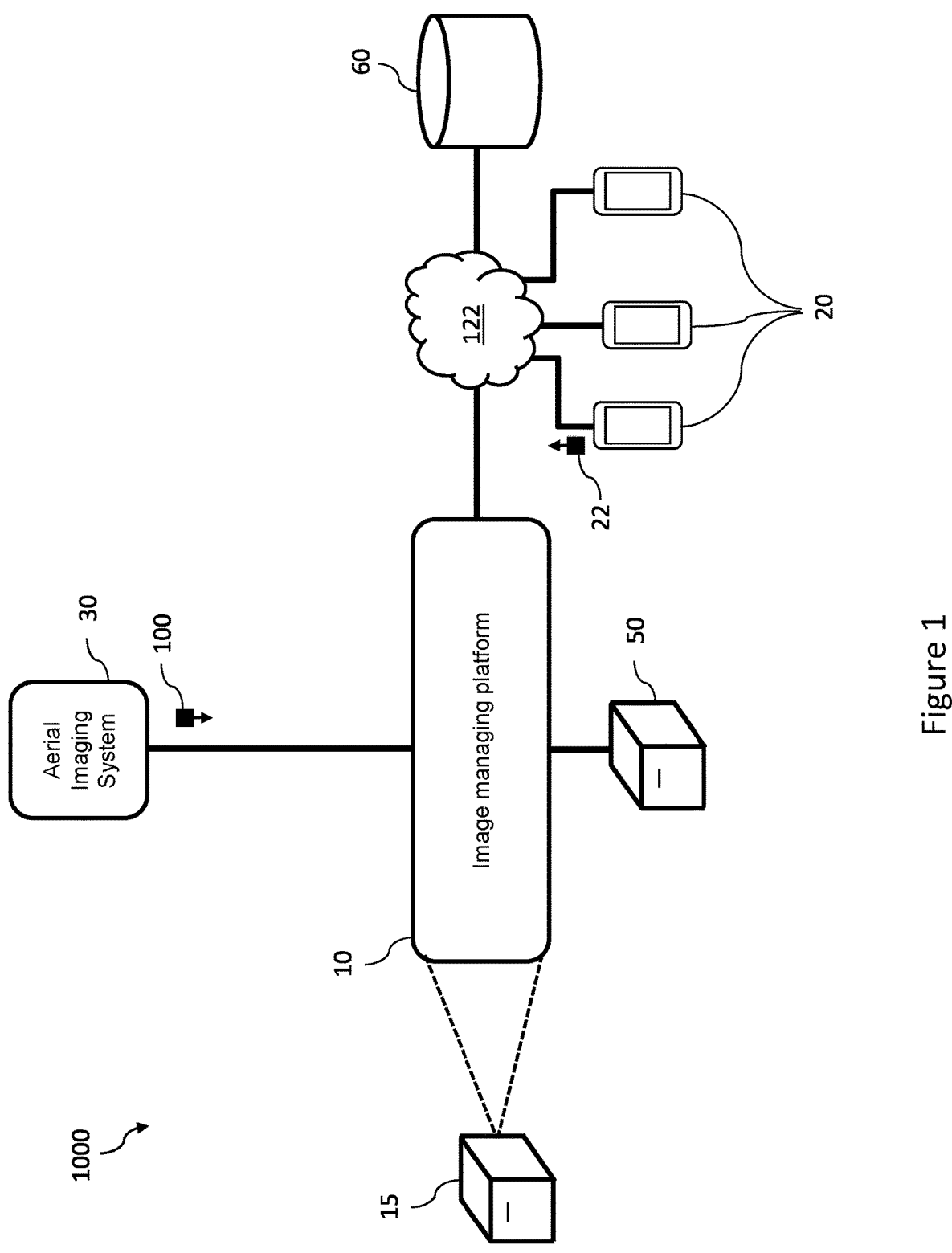
FIG. 1 is a schematic representation of an aerial image management environment in accordance with non-limiting implementations of the present technology.

Unless otherwise indicated, it should be noted that the figures may not be drawn to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes that may be substantially represented in non-transitory computer-readable media and so executed by a computer or processor, whether or not such computer or processor is explicitly shown.

The functions of the various elements shown in the figures, including any functional block labeled as a "processor" or "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some implementations of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

In the context of the present specification, a "server" is a computer program that is running on appropriate hardware and is capable of receiving requests (e.g., from client devices) over a network, and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this soft-ware and hardware may be one server or multiple servers, both of which are included within the expression "at least one server".

In the context of the present specification, "user device" is any computer hardware that is capable of running software appropriate to the relevant task at hand. Thus, some (non-limiting) examples of user devices include personal computers (desktops, laptops, netbooks, etc.), smartphones, and tablets, as well as network equipment such as routers, switches, and gateways. It should be noted that a device acting as a user device in the present context is not precluded from acting as a server to other user devices. The use of the expression "a user device" does not preclude multiple user devices being used in receiving/sending, carrying out or causing to be carried out any task or request, or the consequences of any task or request, or steps of any method described herein.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "dataset" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, the expression "component" is meant to include software (appropriate to a particular hardware context) that is both necessary and sufficient to achieve the specific function(s) being referenced.

In the context of the present specification, the expression "memory" is intended to include media of any nature and kind whatsoever, including RAM, ROM, disks (CD-ROMs, DVDs, floppy disks, hard drivers, etc.), USB keys, solid state-drives, tape drives, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a data object with respect to a particular data storage device, or some other means of directing the recipient of the indication to a network location, memory address, database table, or other location where the data object may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present disclosure, an aerial image is an image taken from above a surface. In some embodiments, the capture may be completed by any imaging system disposed on an aerial vehicle, such as an unmanned aerial vehicle (UAV), a satellite, a space station, or any other apparatus that may carry an imaging system above the surface of a planet (e.g., planet Earth), a satellite (e.g., the moon), a star (e.g., the sun) and so on.

With these fundamentals in place, we will now consider some non-limiting examples to illustrate various implementations of aspects of the present technology.

Referring to FIG. 1, there is shown a schematic diagram of an aerial image management environment (AIME) 1000, the AIME 1000 including an image managing platform 10 operated by a server 15. The server 15 is thus suitable for implementing non-limiting of the present technology. It is to be expressly understood that the AIME 1000 as depicted is merely an illustrative implementation of the present technology. Thus, the description thereof that follows is intended to be only a description of illustrative examples of the present technology. This description is not intended to define the scope or set forth the bounds of the present technology. In some cases, what is believed to be helpful examples of modifications to the AIME 1000 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the AIME 1000 may provide in certain instances simple implementations of the present technology, and that where such is the case they have been presented in this manner as an aid to understanding. As persons skilled in the art would understand, various implementations of the present technology may be of a greater complexity.

Generally speaking, the server 15, by operating the image managing platform 10, provides efficient storage of aerial images and retrieval of said images for distribution thereof to users of the image managing platform 10. Broadly speaking, the server 15 may receive captured aerial images and generate compressed files containing the captured aerial images in order to reduce storage requirements for storing information included in the captured aerial images. The server 15 may further retrieve a given captured aerial image and further transmit the given captured aerial image to a user of the image managing platform 10 having a right to access this captured aerial image. The image managing platform 10 may thus be referred to as an "image storing service" where users may access captured aerial images that are stored according to the methods disclosed herein. The users of the image managing platform 10 may be human entities, companies, firms, or any other entity that may find interest in using the image managing platform 10.

More specifically, with reference to FIG. 1, the AIME 1000 includes the server 15 that hosts, operates and runs the image managing platform 10, one or more aerial imaging systems 30 (only one of which is depicted for clarity of FIG. 1) communicably connected to the server 15, each aerial imaging system 30 transmitting, in use, data objects 100 to the image managing platform 10. The AIME 1000 also includes a data storage device 50 communicably connected to the server 15 for storing data such as the data objects 100. In some implementations, communication between the data storage device 50 and the server 15 is made over a wireless communication link (not shown).

In an implementation, the AIME 1000 further includes one or more user devices 20 communicably connected to the server 15 for accessing the image managing platform 10. Each user device may be associated with a user, and may thus be simply referred as a "user" 20. As such, the data storage device may be a multi-tenant data storage device 50 where each user 20 has a right to access one or more compressed files stored therein. More specifically, each user 20 is communicably connected to the server 15 over a communication network 122 via any wired or wireless communication link (not shown) including, for example, 5G, LTE, Wi-Fi, or any other suitable connection. In some non-limiting implementations of the present technology, the communication network 122 may be implemented as the Internet. In other implementations of the present technology, the communication network 122 may be implemented differently, such as any wide-area communication network, local-area communication network, a private communication network and the like. How the communication links between the users 20 and the server 15 are implemented will depend inter alia on how the users 20 and the server 15 are implemented.

In some implementations, the AIME 1000 may further include a database 60 communicably connected to the server 15 to store copies of the received captured aerial images. Communication between the database 60 and the server 15 may be made over the communication network 122 or over another communication network.

The aerial imaging system 30 may include a camera, an infrared sensor, a multispectral sensor, a LIDAR system, a Time-of-Flight sensor 3D camera or any other imaging device. In use, the aerial imaging system 30 generates aerial images upon being hovered over a zone of interest (e.g. a portion of the surface of the Earth) and transmits data objects 10 to the server 15. As will be described in greater details herein below, a given data object 10 includes, in an implementation, a corresponding captured aerial image 110 and a metadata file 120 (both of which are shown on FIG. 2).

Upon receiving a data object 10 from the aerial imaging system 30, the server 15 executes a storage optimization routine to optimize storage of information included in the data object 10 on the data storage device 50. Broadly speaking, the server 15 generates compressed files using the captured aerial images 110 by leveraging compression and encoding protocols such as, for example and without limitation, the High Efficiency Video Coding (HEVC) standard. More specifically, the server 15 updates, upon receiving the captured aerial image 110, one or more compressed file stored in the data storage device 50. In an implementation, each compressed file is a compressed form of a sequence of stored aerial images. In use, the captured aerial image 110 is added to a sequence of stored aerial images and is thus further referred to a "stored" aerial image as well.

As will be described in greater details herein after, the aerial images of a same compressed file may be ordered based on a degree of similarity between the aerial images before a compression thereof, such that properties of the compression and encoding protocols optimize a data size of the compressed file. Regardless of the manner in which the aerial images are sorted, the aerial images are grouped together to form sequences of aerial images, the sequences being then converted into compressed files by the server 15 and stored in the data storage device 50.

Developers of the present technology have realized that storing the aerial images 110 under the form of compressed files provides optimized storing capabilities by reducing the data size for storing the information of the aerial images compared to the cumulated data sizes of the aerial images, even when being compressed using known compression algorithms.

The data storage device 50 may be, for example and without limitations, any Non-Volatile Memory express (NVMe)-based drive from drive manufacturers such as SAMSUNG, SEAGATE, HITACHI, INTEL or any other manufacturer, or any type of storage array or storage solution.

In some implementations, the server 15 also generates a copy of the received data object 10 and transmits said copy to the database 60 for storage thereof. As such, the database 60 may be referred to as a "cold" data storage device for storing data that are rarely accessed by the server 15. The database 60 may be, for example and without limitations, any Hard Disk Drive (HDD) or Solid-State Drive (SSD)-based drive from drive manufacturers such as SAMSUNG, SEAGATE, HITACHI, INTEL or any other manufacturer, or any type of storage array or storage solution.

The server 15 may receive retrieval instructions 22 from a given user 20 desiring to access one or more aerial images. In response to receiving the retrieval instructions 22, the server 15 may selectively identify a target aerial image based on the retrieval instruction 22 and retrieve and transmit the target aerial image to the user 20, depending on access rights of the given user, as will be described in greater details herein after.

In the depicted non-limiting implementation of the present technology, the server 15 is a single server. In alternative non-limiting implementations of the present technology, the functionality of the server 15 may be distributed and may be implemented via multiple servers. Although illustrative examples and use case scenarios are related to storing and retrieval of aerial images in mind, systems, methods and processors disclosed herein may be readily used for other type of images such as surveillance images capture by closed-circuit television (CCTV) cameras, or any other type of images. As such, any system or method variation configured to optimize storage of images can be adapted to execute implementations of the present technology, once teachings presented herein are appreciated.

Figure 2:
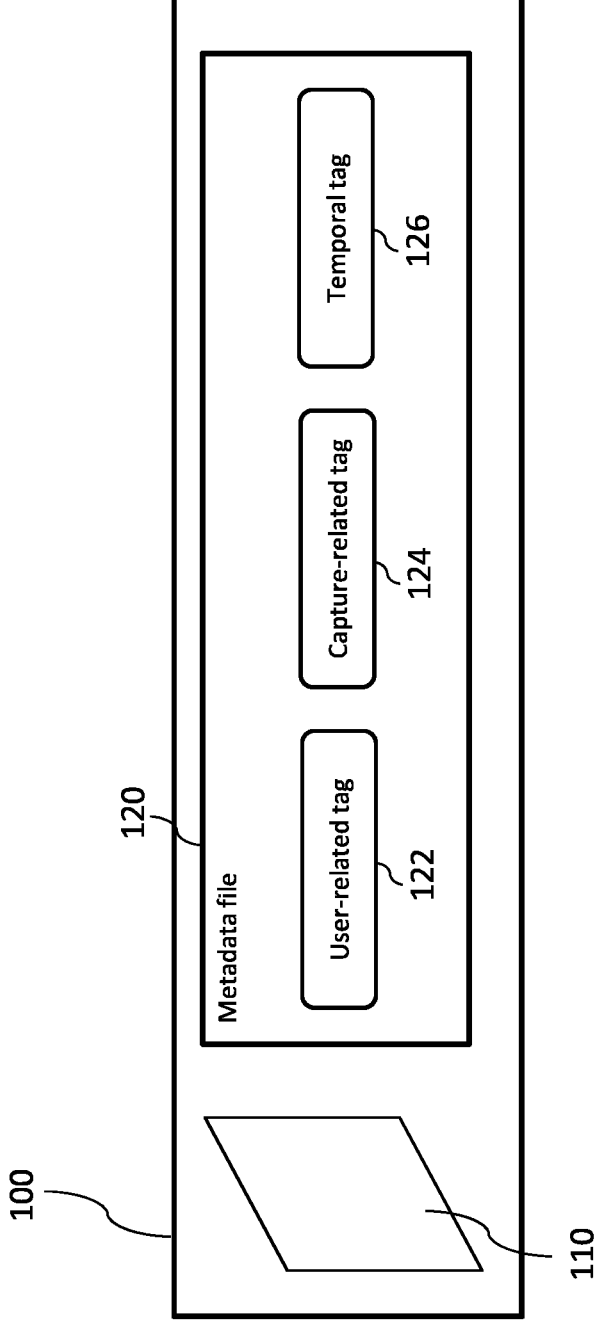
FIG. 2 is a schematic representation of a data object in accordance with non-limiting implementations of the present technology.

As best shown on FIG. 2, the data object 100 includes a captured aerial image 110 and a corresponding metadata file 120. The captured aerial image 110 is an image of an aera that may be, for example and without limitations, a city or a portion thereof, a village, a forest, a beach, a field, a construction site, or any other aera that may be imaged by the aerial imaging system 30. A data format of the captured aerial image 110 may be Portable Network Graphic (PNG), Joint Photographic Experts Group (JPEG), Raw or any other suitable compressed or uncompressed data format.

In an implementation, the metadata file 120 includes a user-related tag 122, a capture-related tag 124 and a temporal tag 126. The user-related tag 122 is indicative of an identification of a corresponding user 20. For example, the aerial image 110 may have been captured specifically for a given user 20 and thus belongs to the user 20 and/or having access rights for the captured aerial image 110. The capture-related tag 124 is indicative of operational parameters of a capture of the captured aerial image 110. For example, the operational parameters may include information about the aerial imaging system 30 at a time of capture of the captured aerial image 110. As such, the capture-related tag 124 may provide indication about whether the captured aerial image 110 is a Red-Green-Blue (RGB) image, a monochromatic image or an infrared image, and may also include information and/or identification of the aerial imaging system 30. The capture-related tag 124 may also include geospatial data (e.g. Global Positioning System (GPS) coordinates) indicative of a location of a zone of interest imaged on the captured aerial image 110. The capture-related tag 124 may also include a cloud overcasting value indicative of a relative portion of the captured aerial image 110 that is overcast with clouds. The temporal tag 126 is indicative of a time of a capture of the captured aerial image 110. Additional tags of the metadata file 120 are contemplated in alternative implementations.

In an implementation, the geospatial data is determined by the server 15 upon receiving the metadata file 120. For example, the captured aerial image 110 may be a satellite image captured by a given satellite at a given time of capture. The server 15 may identify, based for example on information included in the capture-related tag 124, said given satellite and a position thereof relatively to the Earth at the given time of capture. The position of the satellite at the time of capture may be determined by the server 15 by employing a look-up table, accessing a dedicated database, or by any other suitable manner. The geospatial data may further be inferred by the server 15 from the position of the satellite at the time of capture. A data size of the metadata file 120 may thus be reduced by not including the geospatial data or any GPS coordinates.

In some implementations, the aerial imaging system 30 is a satellite or any apparatus or vessel orbiting around the Earth that includes an imaging device, and the captured aerial image 110 is a satellite image. The captured geospatial data may thus be inferred by the server 15 from identification of the aerial imaging system 30 and the temporal tag 126. Indeed, by accessing a time of capture of the captured aerial image 100 and an identification of the aerial imaging system 30, a position of the aerial imaging system 30 relatively to the Earth may be determined at the time of the capture. The zone of interest imaged by the captured aerial image may thus be determined based on the position of the aerial imaging system 30 at the time of the capture.

Figure 3:
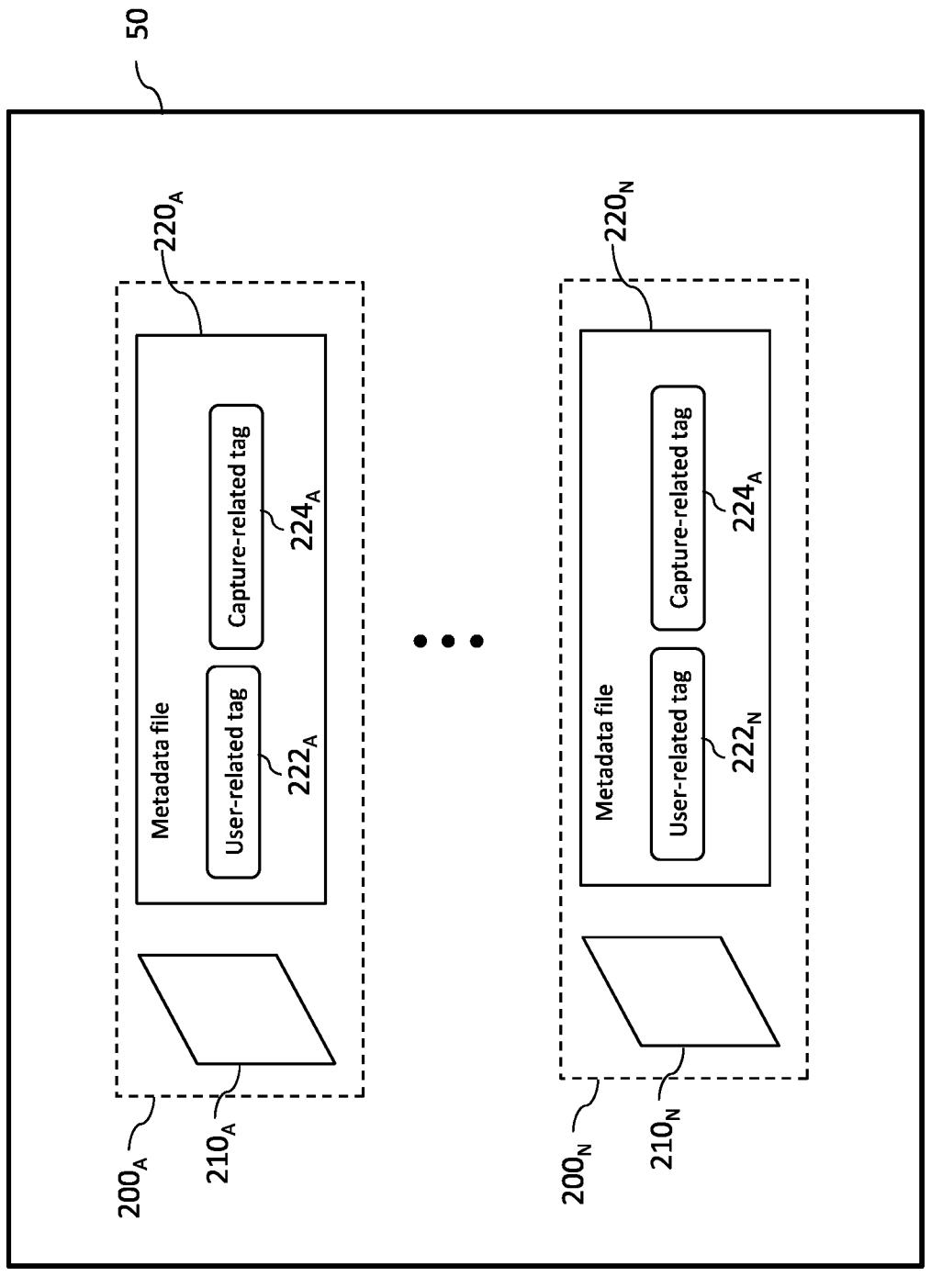
FIG. 3 is a schematic representation of a content of a data storage device of the aerial image management environment of FIG. 1.
Figure 4:
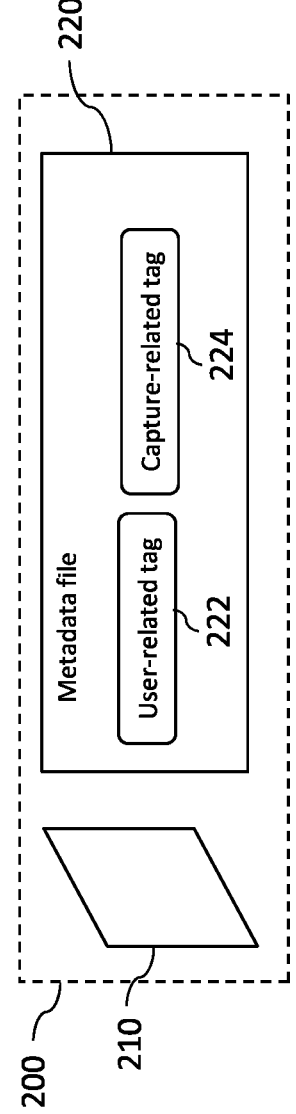
FIG. 4 is a schematic representation of a data object stored in the data storage device of FIG. 1 in accordance with non-limiting implementations of the present technology.

With respect to FIGS. 3 and 4, the data storage device 50 stores a plurality of compressed data objects 200$_A$, . . . , 200$_N$ that are implemented as the compressed data object 200 (see FIG. 4). Each compressed data object 200 includes a compressed file 210 that may have a common or different data formats, such as PNG, JPEG, RAW, Audio Video Interleave (AVI), Moving Pictures Expert Group 4 (MPEG-4), Quick-Time File Format (QTTF), HEVC or any other suitable data format, and a corresponding metadata file 220.

In an implementation, the metadata file 220 includes a user-related tag 222 and a capture-related tag 224. The user-related tag 222 is indicative of an identification of a corresponding user 20 (or a plurality of users 20) that owns or has the right to access the compressed data object 200.

A compressed file 110 is a compressed form of a sequence of at least one stored aerial image. The capture-related tag 224 is indicative of operational parameters of a capture of the stored aerial image corresponding to the compressed file 210. The capture-related tag 224 may also include captured geospatial data indicative of a location of a zone of interest imaged on the stored aerial image corresponding to the compressed file 210.

The metadata file 220 associated with the compressed file 110 may also include information about:

relative positions of the stored aerial images in the sequence of stored aerial images;

indication of a time of a capture of the each of the stored aerial image; and other operational parameters of a capture of each stored aerial image.

In some implementations, the compressed files 210 are defragmented into a plurality of "compressed file blocks" using known defragmentation process to further improve a compression rate of the of compressed files 210. The operations described herein are referring to compressed files but may also be also applied to compressed file blocks.

In an aspect, the present technology may be used to optimize storage of aerial images received by the server 15. Broadly speaking, the server 15 leverages encoding algorithms on captured aerial images to minimize a data storage size of said aerial images in the data storage device 50. As a person skilled in the art of data compression would know, typical encoding algorithms operate with relatively higher performance in terms of compression for images or for inputs being relatively similar. It may thus be beneficial to group aerial images into sequences and further apply encoding algorithms onto said sequences, the aerial images of a same sequence being relatively similar, in order to maximize a compression ratio of the encoding algorithms.

Therefore, the server 15 may first identify a compressed file for each received data object 100 in order to further add the captured aerial image 110 of the received data object 100 to the identified compressed file, thereby "updating" the identified compressed file. In an implementation, the compressed file is selected based on the metadata file 120 corresponding to the captured aerial image 110 and the metadata files 220 of the compressed data objects 200.

In use, upon receiving a data object 100, the server 15 accesses the metadata file 120 and the user-related tag 122 included therein. The user-related tag 122 is indicative of a first user 20 associated with the data object 100. For example, the first user 20 may have directly or indirectly instructed the aerial imaging system 30 to capture an aerial image. In response, the aerial imaging system 30 has captured the aerial image and generated the data object 100.

The server 15 further accesses the data storage device 50 and selects the compressed data object 200 having a metadata file 220 including a user-related tag 222 corresponding to the first user 20. For example, there may be three compressed data objects 200 corresponding to the first user 20 (i.e. having a metadata file 220 including a user-related tag 222 indicative that the corresponding compressed file 210 is associated with the first user 20). It can thus be said that the server 15 performs a selection of a set of compressed data objects 200 based on a matching of the user-related tag 122 of the captured image 110 and the user-related tags 222 of the compressed files 210 stored in the data storage device 50.

Once the set has been selected, the server 15 compares the captured geospatial data of the captured-related tag 124 with the captured geospatial data indicative of a location of a zone of interest imaged on the compressed file 210. In other words, the server 15 determines whether a first aera imaged on the captured aerial image 110 corresponds to another zone imaged on a compressed file 210 among the compressed files 210 of the set previously identified.

In response to the captured geospatial data of the captured-related tag 124 corresponding to the captured geospatial data of the captured-related tag 224 of a given compressed file 210, the given compressed file 210 is identified as a "target" compressed file 210 for the captured aerial image 110.

For example, the captured aerial image 110 may image a zone of interest A (e.g. a portion of a sand beach), a first compressed file 210 may image a zone of interest B, and a second compressed file 210 may image the zone of interest A. The server 15 may determine that both of the captured aerial image 110 and the second compressed file 210 image the same zone of interest by comparing the captured geospatial data associated with the captured aerial image 110, the first compressed file 210 and the second compressed file 210. The server 15 may thus identify the second compressed file 210 as the target compressed file 210. The second compressed file 210 will further be updated as described herein below.

Additional characteristics of the compressed files 210 may be assessed to select the target compressed file. For example, the server 15 may compare information included in the capture-related tag 124 (e.g. the cloud overcasting value), instead of or in addition to the above-described indication of a zone of interest, with corresponding information included in the capture-related tags 224 of the selected compressed file 210. The server 15 may thus determine whether the captured aerial image 110 has been captured using the same process and/or technology than the stored aerial images compressed file 210.

In response to the information included in the capture-related tag 124 matching with information included in the capture-related tags 224 of a given selected compressed file 210 or a portion thereof, said selected compressed file 210 is identified as the compressed file 210 for the captured aerial image 110.

With respect to the previous example, in a scenario where a third compressed file images the zone of interest A, the server 15 may select the second and third compressed files as candidates to be the target compressed file for the captured aerial image 110. For example, the capture-related tag 124 of the captured aerial image 110 may be indicative that the captured aerial image 110 has been captured using an infrared sensor, the capture-related tag 224 of the second compressed file 210 may be indicative that at least one corresponding stored aerial image has been captured using a Red-Blue-Green (RGB) camera, and the capture-related tag 224 of the third compressed file 210 may be indicative that at least one corresponding stored aerial image has been captured using an infrared sensor. Therefore, the third compressed file 210 is selected to be the target compressed file 210 for the captured aerial image 110.

Figure 5:
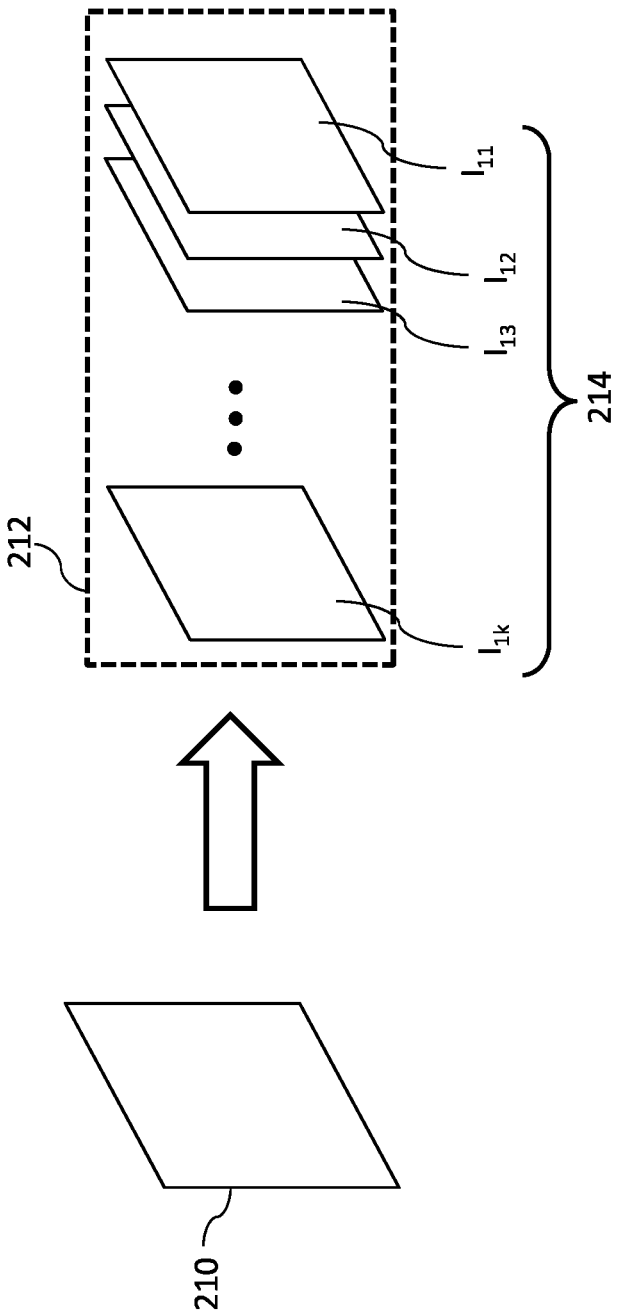
FIG. 5 is a schematic representation of a generation of a sequence of stored aerial images from a compressed file in accordance with non-limiting implementations of the present technology.
Figure 6:
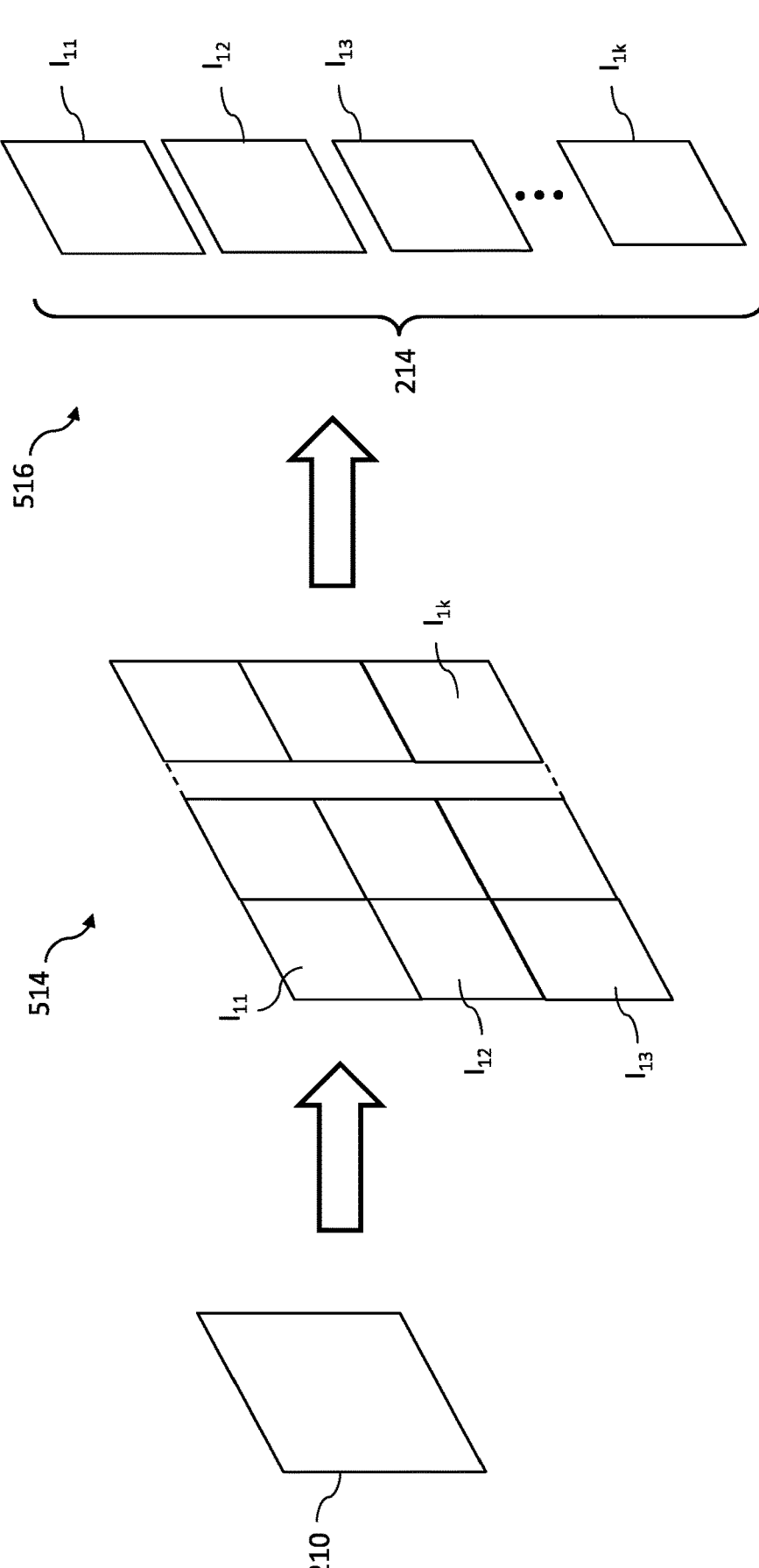
FIG. 6 is a schematic representation of a generation of a sequence of stored aerial images from a compressed file in accordance with other non-limiting implementations of the present technology.

An update of the target compressed file 210 to store the captured aerial image 110 will now be described. Firstly, the target compressed file 210 is accessed by the server 15 and converted into a sequence 212 of stored aerial images 214, as shown in FIGS. 5 and 6. More specifically, the server 15 extracts the sequence 212 of stored aerial images 214 from the target compressed file 210, the sequence 212 of stored aerial images 214 comprising at least one stored aerial image 214. In the illustrative example of FIG. 5, the sequence 212 includes a plurality of stored aerial images 214, namely $I_{11}$, $I_{12}$, . . . , $I_{1k}$. The server 15 may employ extraction algorithms and/or decoding algorithms corresponding to the encoding algorithm that was used for compressing the sequence of stored aerial images.

In an implementation, the target compressed file 210 is a video file. For example, a data format of the target compressed file 210 may be AVI, WMV, H264 or any other video format. In an implementation shown in FIG. 5, the sequence 212 is a temporal sequence 212 where each stored aerial image 214 constitutes a frame of the video file.

In another implementation, the target compressed file 210 is an image file. For example, a data format of the image file may be JPEG, PNG, Graphics Interchange Format (GIF), Tag Image File Format (TIFF) or any other suitable data format. As shown on FIG. 6, the target compressed file 210 is firstly converted into an image concatenation 514 by using decompression algorithms such as open source code library GD, ImageMagick, OpenCV or any other suitable decompression algorithms. The image concatenation 514 is an image having relative high dimension and includes a concatenation of a plurality of stored aerial images $I_{11}$, $I_{12}$, . . . , $I_{1k}$. For example, the image concatenation 514 may be a concatenation of K stored aerial images, each stored aerial image having a dimension of N pixels by M pixels. A dimension of the image concatenation 514 may thus by N pixels by (K·M) pixels, or (N·K) pixels by M pixels, or N×q pixels by (M×K/q) pixels, where K/q is an integer. The server 15 further splits the image concatenation 514 to extract a sequence 516 of stored aerial images from the image concatenation 514.

Each stored aerial image 214 of the sequence 212, and correspondingly of the sequence 516, has a corresponding position in the sequences 212, 516. Information about the position of a stored aerial image 214 is included in the metadata file 220 of the compressed file 210 and may also be included in a metadata file corresponding to the corresponding stored aerial image 214. The metadata file 220 of the compressed file 210 includes information about an identification of each of the stored aerial images 214 and relative positions thereof in the sequences 212, 516.

Figure 7:
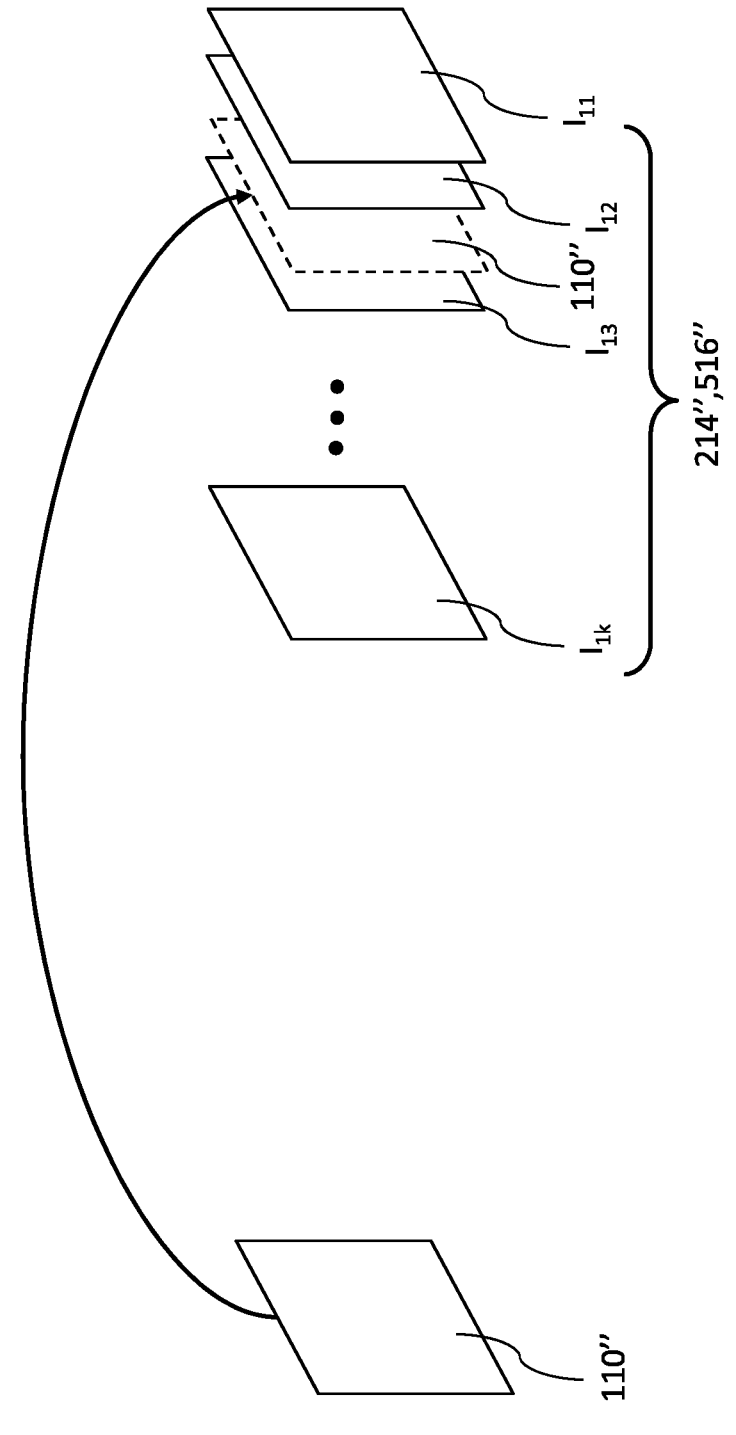
FIG. 7 is schematic representation of an insertion of a given image in a sequence of images in accordance with non-limiting implementations of the present technology.

In an implementation, the server 15 may further determine a position for inserting a new captured aerial image 110" in the sequences 212, 516 of stored aerial images 214 and may further insert the new captured aerial image 110" at the determined position, as shown on FIG. 7.

In one implementation, the server 15 identifies an end position at an end of the sequence 212, 516 and inserts the new captured aerial images 110″ at that end of the sequence 212, 516. The sequence 212, 516 is thus updated and referred to as the sequence 212″, 516″ on FIG. 7. In another implementation, as shown on FIG. 6, the position for inserting the new captured aerial image 110″ is determined by comparing the times of capture of the stored aerial images 214 with the time of capture of the new captured aerial image 110″ and place the new captured aerial image 110″ chronologically in the sequences 212″, 516″.

Figure 8:
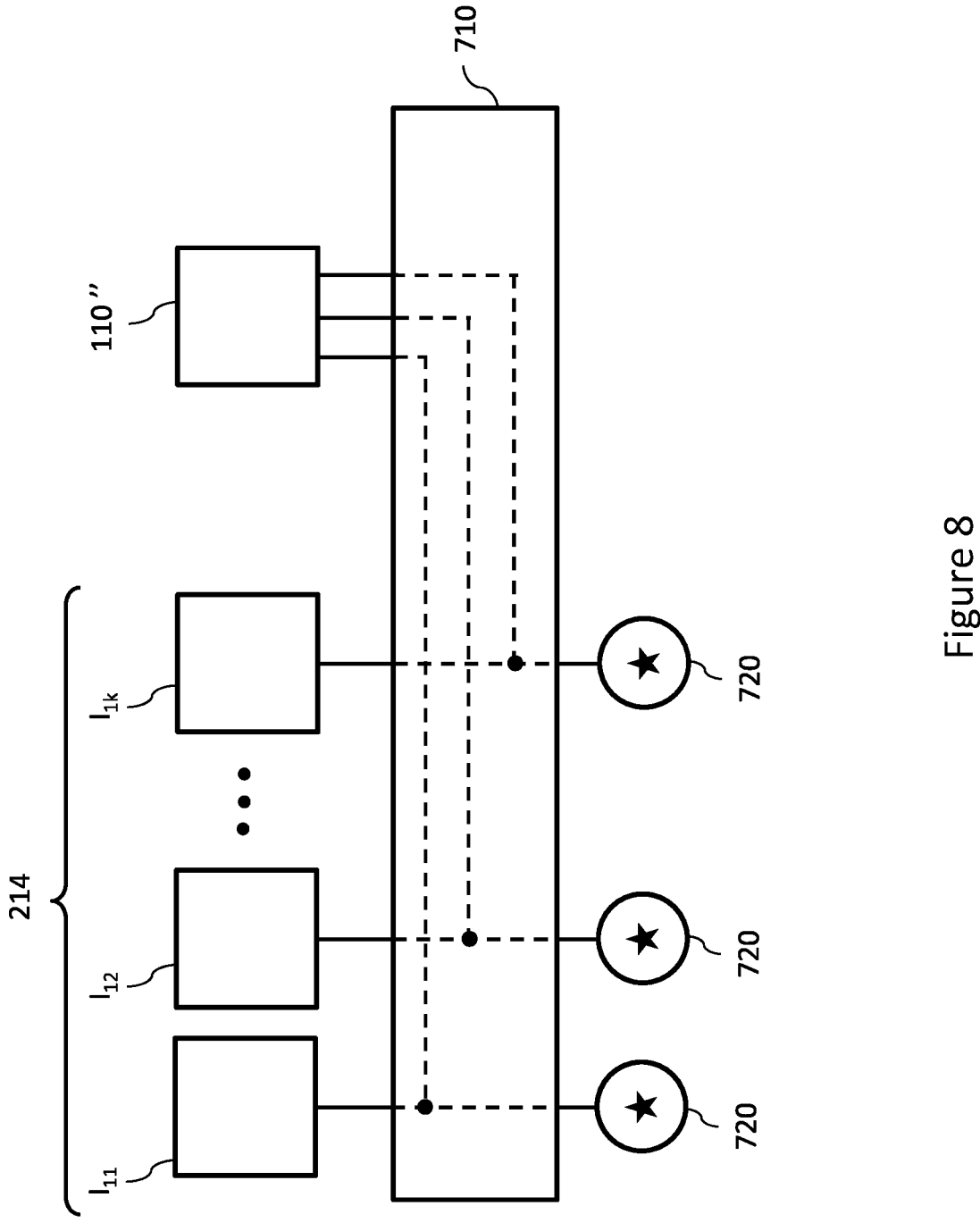
FIG. 8 is a block diagram of an execution of a similarity estimation module by a server of the aerial image management environment of FIG. 1.

In yet another implementation and with reference to FIG. 8, the position for inserting the new captured aerial image 110″ is determined based on visual similarities between the captured aerial images and the stored aerial images 214. More specifically, the server 15 executes a similarity estimation module 710 that takes the stored aerial images 214 and the new captured aerial image 110″ as inputs.

In use, the similarity estimation module 710 outputs, for each stored aerial image 214, a similarity score 720 indicative of a visual similarity between the captured aerial image 110 and the corresponding stored aerial image 214. More specifically, the similarity scores 720 may be determined based on metrics including structural similarity index measure (SSIM) and mean-squared error (MSE) measured between the captured aerial image 110 and the stored aerial image 214. Other techniques for determining the similarity scores 720 may be used such as using Euclidean distance-based functions or any other metrics. In some implementations, the server 15 may employ machine learning algorithms to determine the similarity scores 720. For example, the server 15 may locally execute the machine learning algorithms or cause execution of said machine learning algorithms by other data processing devices (e.g. remote dedicated servers).

In the context of the present disclosure, structural similarity index measure (SSIM) is a known perception-based model for predicting a perceived quality of an image, the SSIM may be used for measuring the similarity between two images. In the context of the present disclosure, the mean-squared error (MSE) between two images h(x,y) and g(x,y) may be defined as $$e_{MSE} = \frac{1}{MN} \sum{}_{m=1}^{M} \sum{}_{n=1}^{N} (h(n, m) - g(n, m))^2.$$

A lower MSE value indicates greater similarity between the two images.

In an implementation, downgraded versions of the stored aerial images 214 may be used as inputs of the similarity estimation module 710 instead of the stored aerial images 214. This may reduce a computation time of the server 15 to determine the similarity scores 720. The downgraded versions of the stored aerial images 214 may be generated by the server 15 by generating copies of the stored aerial images 214 and apply known downgrading techniques such as pixel aggregation, pixel downsampling or any other suitable downgrading techniques. In some implementations, the server 15 may use image hashing techniques to assign a distinct hash value to each stored aerial image 214, downgraded versions of the stored aerial images 214 having the same hash value upon being generated. A given stored aerial image 214 and a downgraded version thereof thus have a same unique hash value. Differences between the hash values of downgraded versions of different stored aerial images 214 may be used to determine the similarity scores 720.

Upon having determined the similarity scores 720, the server 15 may define the position for inserting the captured aerial image 110 adjacent to a given one of the stored aerial images 214 having the highest similarity score 720. The given stored aerial image 214 having the highest similarity score 720 is referred to as the "closest" stored aerial image 214 with respect to the captured aerial image 110.

The position defined for inserting the captured aerial image 110 may be further adjusted. In one implementation, in response to the closest stored aerial image 214 being located at an end of the sequence 212, 516, the position defined for inserting the captured aerial image 110 may be defined at said end of the sequence 212, 516, such that the closest stored aerial image 214 is sandwiched between the captured aerial image 110 and a consecutive one of the stored aerial images 214.

In the same or another implementation, in response to the closest stored aerial image 214 being sandwiched between a first stored aerial image 214 and a second stored aerial image 214 in the sequence 212, 516, the server 15 may compare the similarity scores 720 of the first and second stored aerial images 214. In response to the similarity score 720 of the first stored aerial image 214 being higher than the similarity score 720 of the second stored aerial image 214, the may define the position for inserting the captured aerial image 110 between the closest stored aerial image 214 and the first stored aerial image 214.

In some implementations, the server 15 may perform image processing operations before inserting the captured aerial image 110 at the determined position in the sequence 212, 516.

The image processing operations may include zooming, cropping, rotating, or any other image processing operations to align the captured aerial image 110 with the stored aerial images 214 of the sequence 212, 516. FIG. 9 illustrates a stored aerial image 214 of the sequence 212, 516 extracted from the target compressed file 210 on which two entities A and B are imaged. For example, entity A may be a townhall, and entity B may be a parc. It should be noted that locations of the entities A and B may be stored in a memory of the server 15 or accessible thereto, without a clear definition of what the entities are. The entities A and B may simply be any known sets of coordinates (e.g. GPS coordinates). It should be noted that the set of coordinates of any point in an aerial image 110, 214 may be determined based on the temporal tag and the capture-related tag associated therewith.

In use, the server 15 may execute the image processing operations onto the captured aerial image 110 such that the captured aerial image 110 has a same orientation and a same scale than the stored aerial image 214. As shown on FIG. 9, entities A and B have respective first relative positions on the stored aerial image 214, while entities A and B have respective second relative positions on the captured aerial image 110. Based on a difference between the first and second relative positions, the server applies the image processing operations onto the captured aerial image 110 such that the second relative positions match the first relative positions. The captured aerial image 110 may thus be referred to as an "aligned" version 110′ of the captured aerial image 110. In the example of FIG. 9, the image processing operations are a clock-wise rotation operation, a zooming operation and a cropping operation. A higher number of entities (i.e. a higher number of sets of coordinates) may be used to determine the image processing operations to apply to the captured aerial image 110. In some implementations, application of the image processing operations is performed before determining the position of the captured aerial image 110 in the sequence 212, 516 such that determination of said position is made using the captured aerial image 110 once aligned with the stored aerial image 214.

The aligned version 110' is further inserted at the determined position into the sequence 212, 516. In other words, the sequence 212, 516 of stored aerial images 214 is updated by inserting the aligned version 110' in the sequence 212, 516 of stored aerial images 214 at the determined position.

Once the new captured aerial image 110" or the aligned version 110' thereof has been inserted, the server 15 may then update the target compressed file 210 by applying an encoding algorithm to the sequence 212", 516" of stored aerial image 214. In scenarios where the target compressed file 210 is a video file, the encoding algorithm may be a video encoding algorithm. Said video encoding algorithm may use, for example and without limitation, a High Efficiency Video Coding (HEVC) compression standard. Use of other compression standards such as MPEG, MOV, AVI, etc. is also contemplated. In scenarios where the target compressed file 210 is an image file, the encoding algorithm is an image encoding algorithm. Said image encoding algorithm may use, for example and without limitation, a DEFLATE compression algorithm for generating a ZIP file. The alignment of the captured aerial image and the determination of the position defined for inserting the captured aerial image in the sequence permit to reduce differences between consecutive aerial images of the sequence, and thus leverage functionalities of known encoding algorithm such as, for example, the HEVC compression standard.

Once updated, the compressed file is further stored on the data storage device 50. The metadata file 220 of the compressed file 210 is updated based on the metadata file of the new captured aerial image 110" and the position defined for inserting said new captured aerial image 110" or the aligned version 110' thereof.

Figure 10:
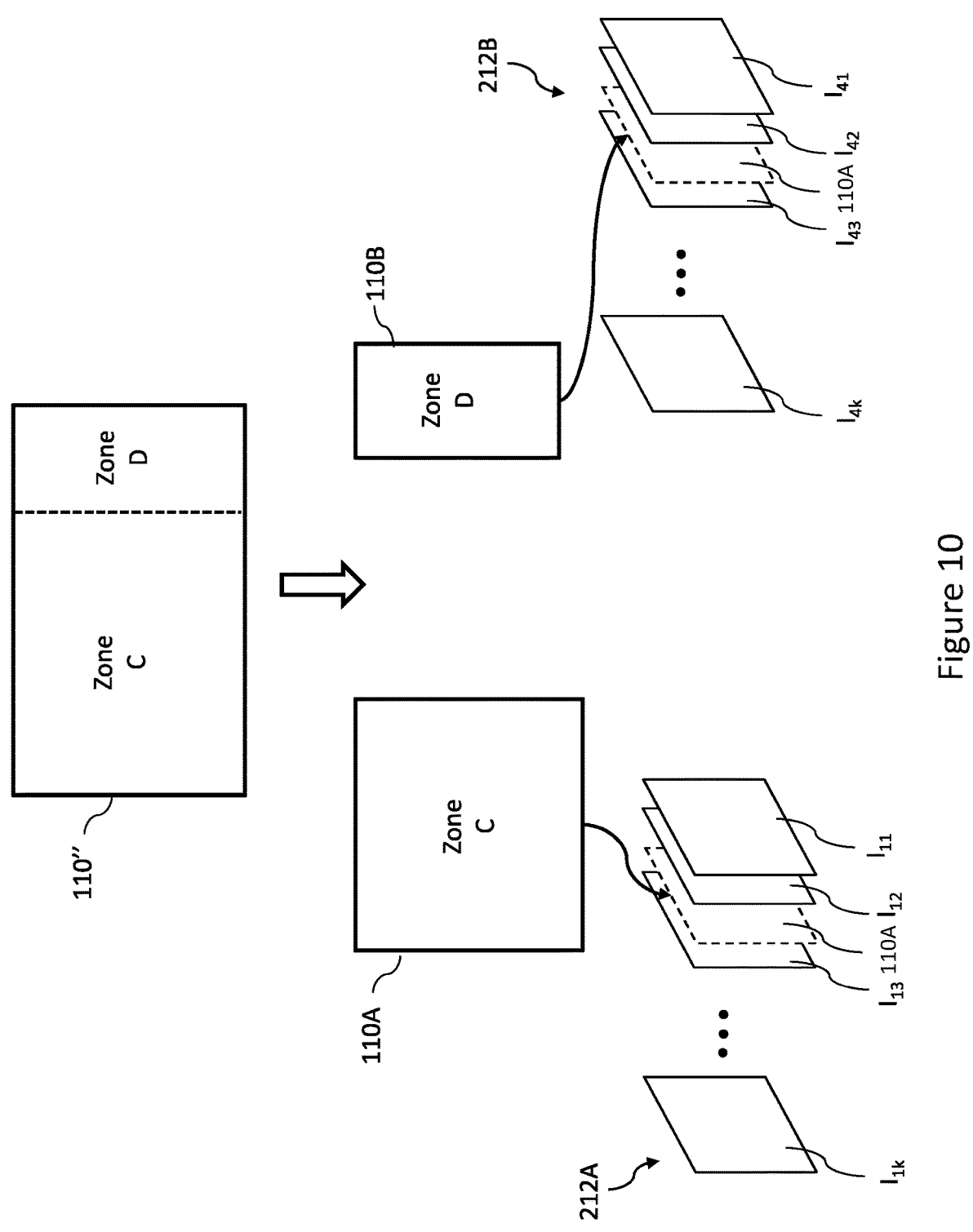
FIG. 10 is a schematic representation of an update of two compressed files based on a single captured aerial image in accordance with non-limiting implementations of the present technology.

FIG. 10 is a schematic representation of an update of two compressed files based on the new captured aerial image 110" by the server 15 in accordance with non-limiting implementations of the present technology. A first sequence 212A extracted from a first one of the two compressed files and a second sequence 212B extracted from a second one of the two compressed files are illustrated on FIG. 9. The first and second sequences 212A, 212B are temporal sequences in this illustrative implementation, but they may be sequences extracted from corresponding image concatenations, such as the sequence 516, in alternative implementations.

In some instances, the server 15 may determine that the new captured aerial image 110" images a plurality of zones of interest based on captured geospatial data included in the capture-related tag 124. For example, as depicted on FIG. 9, a first zone of interest C and a second zone of interest D are imaged on the new captured aerial image 110". In other words, the captured geospatial data of the capture-related tag 124 is indicative of locations of the first and second zones of interest C, D.

Based on capture-related tags 224 of compressed files 210 stored on the data storage device 50, the server 15 may determine that a plurality of compressed files 210 should be updated with the new captured aerial image 110". In other words, a plurality of compressed files 210 image a corresponding zone of interest that is included in the plurality of zones of interest imaged in the new captured aerial image 110". In the example of FIG. 10, the compressed file 210A images the first zone of interest C, and the compressed file 210B images the second zone of interest D.

In an implementation, the server 15 splits the new captured aerial image 110" into a plurality of portions, each portion imaging a corresponding zone of interest of the plurality of zones of interest. It can be said that the server 15 synthesises copies of the captured aerial image or generates synthesis aerial images from the new captured aerial image 110". The server 15 further crops the new captured aerial image 110" and the synthesis aerial images to contour the corresponding zones of interest.

As shown on FIG. 10, the server 15 thus generates a first cropped aerial image 110A and a second cropped aerial image 110B. The first cropped aerial image 110A may be the new captured aerial image 110" after a cropping operation, and the second cropped aerial image 110B may be a synthesis aerial images generated from the captured aerial image 110.

Each of the first and second cropped aerial images 110A, 110B may be associated with a metadata file generated by the server 15 from the metadata file 120 of the new captured aerial image 110". For example, a capture-related tag of the metadata file corresponding to the first cropped aerial image 110A may include captured geospatial data indicative of a location of the first zone of interest C. Also, a capture-related tag of the metadata file corresponding to the second cropped aerial image 110B may include captured geospatial data indicative of a location of the second zone of interest D.

The first and second cropped aerial images 110A, 110B may be further inserted in the sequences 212A, 212B respectively according to the methods described herein.

In use, the server 15 may receive retrieval instruction 22 from a user 20 to access a target aerial image stored in the data storage device 50. The retrieval instruction 22 may include an identification of a target user-related tag and a target temporal tag, and be transmitted over the communication network 122. In response, the server 15 may identify a target compressed file 210 in the data storage device 50 based on the identification of the user-related tag. The server 15 may further extract the target aerial image from the sequence of stored aerial images of the target compressed file 210 based on the temporal tag.

More specifically, the server 15 may determine a position of the target aerial image in the sequence of stored aerial image based on information included in the metadata file corresponding to the target compressed file. Indeed, each stored aerial image is associated with a position and an indication of a time of capture. By comparing the target temporal tag with the indications of the times of capture of the stored aerial images, the server 15 may identify the target aerial image in the sequence and a relative position thereof. The server may further transmit the target aerial image, or a copy thereof, to the user 20.

Therefore, the present technology may be used to optimize the update of several compressed files related to different zones of interest from one aerial image. More specifically, the optimization is made possible by the generation of synthesis aerial images from one aerial image. The synthesis aerial images correspond to different zones of interest that are related to other compressed files. It should also be noted that the synthesis images are part of these aerial images. As described hereinabove, a second zone of interest can be identified from a first aerial image. Then, a synthesis aerial image including said second zone of interest is generated from said first aerial image to store it in another compressed file corresponding to the second zone of interest. As a result, from only one aerial image, several compressed files may be updated. This allows to increase the number of useful images contained in a given compressed file. This allows also to process several compress files from a single aerial image.

FIG. 11 is a flow diagram of a method 1100 for storing a captured aerial image on a data storage device, such as the data storage device 50, the captured aerial image being associated with a corresponding metadata file, according to some implementations of the present technology.

In one or more aspects, the method 1100 or one or more steps thereof may be performed by a processor or a computer system, such as the server 15. The captured aerial image may be, for example and without limitation, a satellite image. The method 1100 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

The method 1100 starts with accessing, at operation 1110, the captured aerial image and the corresponding metadata file. In an implementation, the captured aerial image is transmitted to the server by an aerial imaging system, such as the aerial imaging system 30.

In an implementation, the server accesses the data storage device and metadata files corresponding to compressed files stored in the data storage device. The server may further select a compressed file among at least one compressed file stored on the data storage device based on the metadata file corresponding to the captured image and on a metadata file corresponding to the compressed file.

More specifically, the server may access, in the metadata file corresponding to the captured aerial image, captured geospatial data indicative of a location of a first zone of interest imaged on the captured aerial image. The server may further compare the captured geospatial data to stored geospatial data of each of the compressed files. The stored geospatial data corresponding to a compressed file are indicative of a location of a corresponding second zone of interest imaged in the compressed file. The server may thus select the compressed file among at least one compressed file in response to the first zone of interest overlapping at least a portion of the second zone of interest.

In an implementation, the data storage device is a multi-tenant data storage device communicably connected with a plurality of users, the metadata file corresponding to each of the at least one compressed file comprising a user-related tag being indicative of an identification of a corresponding one or more user of the plurality of users. The metadata file corresponding to the captured aerial image may include a first user-related tag indicative of an identification of a first user. The metadata file of each of the at least one compressed file may also include a user-related tag indicative of an identification of a user of a corresponding compressed file. The server may thus select the compressed file among the at least one compressed file based on a matching of the first user-related tag with the user-related tags of the at least one compressed file.

In the same or another implementation, the server may determine a first set of compressed files based on a matching of the first user-related tag with the user-related tags of the at least one compressed file and select the compressed file among the first set of compressed files. For example, if a user has a right to access to more than one (e.g. four) compressed files, the first set of compressed files includes the more than one (e.g. four) compressed files.

The method 1100 continues with extracting, at operation 1120, a sequence of stored aerial images from a compressed file stored on the data storage device, the sequence of stored aerial images comprising at least one stored aerial image.

In an implementation, the server may, subsequently to extracting the sequence of stored aerial images, determine a first set of coordinates of a first entity and a second set of coordinates of a second entity based on the captured aerial image and a given aerial image of the sequence of stored aerial images, the first and second entities being imaged on both of the stored aerial image and the given aerial image.

The server may further perform image processing operations onto the captured aerial image to form an aligned version of the captured aerial image based on the first and second sets of coordinates. The image processing operations may include one or more of zooming operations, cropping operations and rotation operations or any other operations suitable for aligning the captured aerial image with the given stored aerial image. In some implementations, the aligned version of the captured aerial image may be used in the following operations of the method instead of the captured aerial image.

The method 1100 continues with determining, at operation 1130, a first position for inserting the captured aerial image in the sequence of stored aerial images. In an implementation, the server identifies the first position at an end of the sequence of stored aerial images.

In another implementation, the server determines, for each of the at least one stored aerial image of the first sequence of stored aerial images, a similarity score indicative of a visual similarity between the captured aerial image and a corresponding stored aerial image of the first sequence of stored aerial images. The server may further define the first position adjacent to a given one of the stored aerial images having the highest similarity score. In the same or another implementation, the server may access downgraded versions of each of the at least one stored aerial image and determine the similarity score based on a visual similarity between the corresponding downgraded version and the captured aerial image for each stored aerial image of the first sequence of stored aerial images.

The method 1100 continues with updating, at operation 1140, the sequence of stored aerial images by inserting the captured aerial image in the sequence of stored aerial images at the first position. Upon being inserted in the sequence of stored aerial images, the captured aerial image may further be referred to as a stored aerial image.

The method 1100 continues with updating, at operation 1150 after updating the sequence of stored aerial images, the compressed file by applying an encoding algorithm to the sequence of stored aerial images.

The compressed file may a video file and each stored aerial image constitutes a frame of the video file, the encoding algorithm being a video encoding algorithm. For example, the video encoding algorithm may use a HEVC compression standard. Alternatively, the compressed file may be an image file and may include information of an image concatenation of a plurality of concatenated stored aerial images, the encoding algorithm being an image encoding algorithm.

The method 1100 ends with storing, at operation 1160, storing the compressed file on the data storage device.

In an implementation, subsequent to storing the compressed file on the data storage device, the server may update a metadata file of the compressed file based on information included in the metadata file corresponding to the captured aerial image. In other words, the metadata file corresponding to the compressed file includes information about the stored aerial images included in the sequence of stored aerial images, the compressed file being a compressed form of the sequence of stored aerial images. For example, the metadata file associated with the compressed file may include information about relative positions of the stored aerial images in the sequence of stored aerial images.

In an implementation, the captured geospatial data of the captured aerial image is further indicative of a location of a second zone of interest imaged in the captured aerial image. In response, the server may generate a synthesis aerial image from the captured aerial image, the synthesis aerial image comprising the second zone of interest, and generate a metadata file corresponding to the synthesis aerial image. The server may execute operations 1120 to 1160 on the synthesis aerial image. More specifically, the server may select a second compressed file among the at least one compressed file based on the metadata file corresponding to the synthesis aerial image and on a metadata file corresponding to the second compressed file and further extract a second sequence of aerial images from the second compressed file, the second sequence of aerial images comprising at least one aerial image, as described in operation 1120.

In the same implementation, the server may further determine a second position for inserting the synthesis aerial image in the second sequence of stored aerial images, as described in operation 1130, and update the second sequence of stored aerial images by inserting the synthesis aerial image in the second sequence of stored aerial images at the second position as described in operation 1140. After updating the second sequence of stored aerial images, the server may update the second compressed file by applying the encoding algorithm to the second sequence of stored aerial images, as described in operation 1150, and store the second compressed file onto the data storage device as described in operation 1160.

In an implementation, the server may receive instruction from a user to retrieve a target aerial image from the data storage device. The instruction may include an identification of a target user-related tag and a target temporal tag. In response, the server may identify a target compressed file in the data storage device based on the identification of the user-related tag. The server may further extract the target aerial image from the sequence of stored aerial images of the target compressed file based on the temporal tag. More specifically, the server may determine a position of the target aerial image in the sequence of stored aerial image based on information included in the metadata file corresponding to the target compressed file. Indeed, each stored aerial image is associated with a position and an indication of a time of capture. By comparing the target temporal tag with the indications of the times of capture of the stored aerial images, the server may identify the target aerial image in the sequence and a relative position thereof. The server may further transmit the target aerial image, or a copy thereof, to the user.

FIG. 12 is a flow diagram of a method 1200 for retrieving a target aerial image from a data storage device, such as the data storage device 50, according to some implementations of the present technology. In one or more aspects, the method 1200 or one or more steps thereof may be performed by a processor or a computer system, such as the server 15. The captured aerial image may be, for example and without limitation, a satellite image. The method 1200 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order. method for retrieving a target aerial image from a data storage device, the data storage device storing at least one compressed file, the method being executable by a server, the method comprising:

The method 1200 begins with accessing, at operation 1210, a retrieval instruction. For example, the retrieval instruction may be received by the server 15 from one of the user 20. The retrieval instruction may include an identification of a target user-related tag, target geospatial data, and a target time of capture of the target aerial image. The target user-related tag is indicative of a user that is expected to have access rights to the target aerial image. The target geospatial data is indicative of a location of a zone of interest imaged on the target aerial image.

The method 1200 continues with accessing, at operation 1220, compressed files stored in the data storage device, each of the at least one compressed file being a compressed form of a sequence of stored aerial images and being associated with a metadata file. The metadata file of a given compressed file may include a user-related tag indicative of an identification of at least one user having access rights to the corresponding compressed file, stored geospatial data indicative of a location of a corresponding zone of interest imaged in that compressed file, and indication of times of capture of the stored aerial images.

The method 1200 continues with identifying, at operation 1230, a target compressed file from the compressed files based on at least one of a comparison of the target user-related tag with the user-related tag of each the at least one compressed file and a comparison of the target geospatial data and the stored geospatial data of each the at least one compressed file. For example, the user having transmitted that retrieval request may have access rights to a plurality of compressed files. Said plurality may be identified by comparing the target user-related tag with user-related tags of each of the compressed files stored in the data storage device. Once said plurality of compressed files is identified, the compressed file having its stored geospatial data matching the target geospatial data may be identified as the target compressed file.

The method 1200 continues with applying, at operation 1240, a decoding algorithm onto the target compressed file to extract the sequence of stored aerial images from the target compressed file.

The method 1200 continues with identifying, at operation 1250, the target aerial image among the stored aerial images of the sequence based on a comparison of the target time of capture and times of capture of the stored aerial images. The stored aerial images may not be stored chronologically in the sequence of stored aerial images. A given stored aerial image may be identified as the target aerial image in response to the corresponding time of captured s indicated in the metadata file of the target compressed file matches (or is the closest to) the target time of capture.

The method 1200 ends with returning, at operation 1260, the target aerial image. For example, the server 15 may retrieve and transmit the target aerial image or a copy thereof to the user 20 that transmitted the retrieval request.

Figure 13:
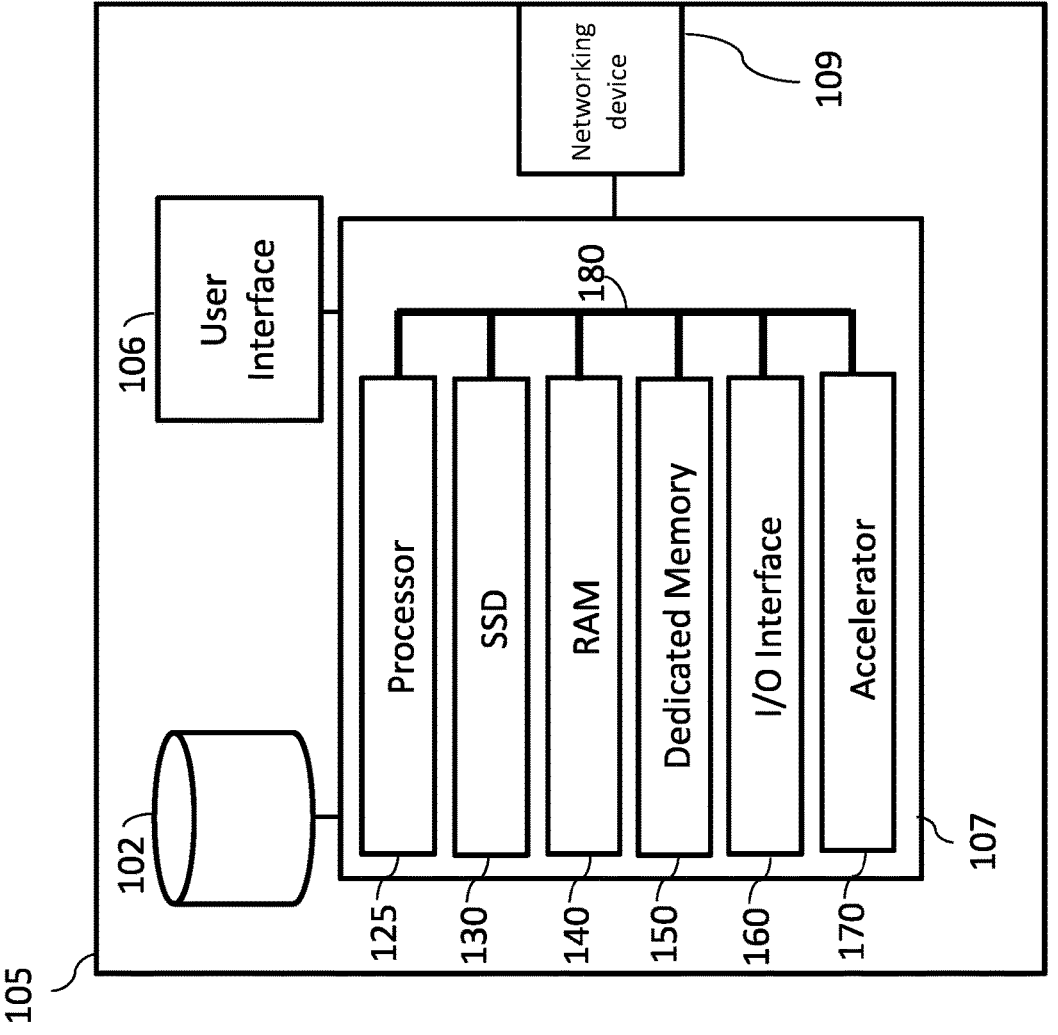
FIG. 13 is a block diagram of an electronic device in accordance with an example of the present technology.

With reference to FIG. 13, there is shown an electronic device 105 in accordance with non-limiting implementations of the present technology. The server 15 and/or the user devices 20 may implemented as the electronic device 105. The electronic device 105 includes a computing unit 107. In some implementations, the computing unit 107 may be implemented by any of a conventional personal computer, a controller, and/or an electronic device (e.g., a server, a controller unit, a control device, a monitoring device etc.) and/or any combination thereof appropriate to the relevant task at hand. In some implementations, the computing unit 107 includes various hardware components including one or more single or multi-core processors collectively represented by a processor 125, a solid-state drive 130, a RAM 140, a dedicated memory 150 and an input/output interface 160. The computing unit 107 may be a generic computer system.

In some other implementations, the computing unit 107 may be an "off the shelf" generic computer system. In some implementations, the computing unit 107 may also be distributed amongst multiple systems. The computing unit 107 may also be specifically dedicated to the implementation of the present technology. As a person in the art of the present technology may appreciate, multiple variations as to how the computing unit 107 is implemented may be envisioned without departing from the scope of the present technology.

Communication between the various components of the computing unit 107 may be enabled by one or more internal and/or external buses 180 (e.g. a PCI bus, universal serial bus, IEEE 1394 "Firewire" bus, SCSI bus, Serial-ATA bus, ARINC bus, etc.), to which the various hardware components are electronically coupled.

The input/output interface 160 may provide networking capabilities such as wired or wireless access. As an example, the input/output interface 160 may include a networking interface such as, but not limited to, one or more network ports, one or more network sockets, one or more network interface controllers and the like. Multiple examples of how the networking interface may be implemented will become apparent to the person skilled in the art of the present technology. For example, but without being limitative, the networking interface may implement specific physical layer and data link layer standard such as Ethernet, Fibre Channel, Wi-Fi or Token Ring. The specific physical layer and the data link layer may provide a base for a full network protocol stack, allowing communication among small groups of computers on the same local area network (LAN) and large-scale network communications through routable protocols, such as Internet Protocol (IP).

According to implementations of the present technology, the solid-state drive 130 stores program instructions suitable for being loaded into the RAM 140 and executed by the processor 120. Although illustrated as a solid-state drive 130, any type of memory may be used in place of the solid-state drive 130, such as a hard disk, optical disk, and/or removable storage media.

The processor 120 may be a general-purpose processor, such as a central processing unit (CPU) or a graphics processing unit (GPU). In some implementations, the processor 120 may also rely on an accelerator 170 dedicated to certain given tasks. In some implementations, the processor 120 or the accelerator 170 may be implemented as one or more field programmable gate arrays (FPGAs). Moreover, explicit use of the term "processor", should not be construed to refer exclusively to hardware capable of executing software, and may implicitly include, without limitation, application specific integrated circuit (ASIC), read-only memory (ROM) for storing software, RAM, and non-volatile storage. Other hardware, conventional and/or custom, may also be included.

Further, the electronic device 105 may include a Human-Machine Interface (HMI) 106. The HMI 106 may include a screen or a display capable of rendering an interface, an output of an MLM and/or an indication of an identification of a candidate MLM, metadata associated therewith, a target MLM, candidate and/or desired machine learning tasks, a ranking score of candidate MLMs, an unlabeled dataset, and/or any other information suitable for performing the methods described herein. In an implementation, the display of the HMI 106 includes and/or be housed with a touchscreen to permit users to input data via some combination of virtual keyboards, icons, menus, or other Graphical User Interfaces (GUIs). The HMI 106 may thus be referred to as a user interface 106. In some implementations, the display of the user interface 106 may be implemented using a Liquid Crystal Display (LCD) display or a Light Emitting Diode (LED) display, such as an Organic LED (OLED) display. The device may be, for example and without being limitative, a handheld computer, a personal digital assistant, a cellular phone, a network device, a smartphone, a navigation device, an e-mail device, a game console, or a combination of two or more of these data processing devices or other data processing devices. The user interface 106 may be embedded in the electronic device 105 as in the illustrated implementation of FIG. 13 or located in an external physical location accessible to the user. For example, the user may communicate with the computing unit 107 (i.e. send instructions thereto and receive information therefrom) by using the user interface 106 wirelessly connected to the computing unit 107. The computing unit 107 may be communicate with the user interface 106 via a network (not shown) such as a Local Area Network (LAN) and/or a wireless connexion such as a Wireless Local Area Network (WLAN).

The electronic device 105 may include a memory 102 communicably connected to the computing unit 107. The memory 102 may be embedded in the electronic device 105 as in the illustrated implementation of FIG. 13 or located in an external physical location. The computing unit 107 may be configured to access a content of the memory 102 via a network (not shown) such as a Local Area Network (LAN) and/or a wireless connection such as a Wireless Local Area Network (WLAN).

The electronic device 105 may also include a power system (not depicted) for powering the various components. The power system may include a power management system, one or more power sources (e.g., battery, alternating current (AC)), a recharging system, a power failure detection circuit, a power converter or inverter and any other components associated with the generation, management and distribution of power in mobile or non-mobile devices.

It should be noted that the computing unit 107 may be implemented as a conventional computer server or cloud-based (or on-demand) environment. Needless to say, the computing unit 107 may be implemented in any other suitable hardware, software, and/or firmware, or a combination thereof. In the depicted non-limiting implementations of the present technology in FIG. 13, the computing unit 107 is a single server. In alternative non-limiting implementations of the present technology, the functionality of the computing unit 107 may be distributed and may be implemented via multiple servers.

Those skilled in the art will appreciate that processor 120 is generally representative of a processing capability that may be provided by, for example, a Central Processing Unit (CPU). In some implementations, in place of or in addition to one or more conventional CPUs, one or more specialized processing cores may be provided. For example, one or more Graphic Processing Units (GPUs), Tensor Processing Units (TPUs), accelerated processors (or processing accelerators) and/or any other processing unit suitable for training and executing an MLM may be provided in addition to or in place of one or more CPUs. In an implementation, the processor 120 of the computing unit 107 is a Graphical Processing Unit (GPU) and the dedicated memory 150 is a Video Random access Memory (VRAM) of the processing unit 120. In alternative implementations, the dedicated memory 150 may be a Random Access Memory (RAM), a Video Random Access Memory (VRAM), a Window Random Access Memory (WRAM), a Multibank Dynamic Random Access Memory (MDRAM), a Double Data Rate (DDR) memory, a Graphics Double Data Rate (GDDR) memory, a High Bandwidth Memory (HBM), a Fast-Cycle Random-Access Memory (FCRAM) or any other suitable type of computer memory.

Experimental measurements have been carried out using the following operational parameters. By generating a compressed video file from a sequence of fifty stored aerial images having a PNG data format and using a MP4 compression algorithm, the compressed file has a data size that is 40.86% of the sum of the data sizes of the fifty stored aerial images. The MSE and SSIM for the fifty stored aerial images are below 0.4 and above 0.997 respectively. As another example, by generating a compressed image file from a sequence of fifty stored aerial images having a PNG data format and using ImageMagick free software (https://www.imagemagick.org), the compressed file has a data size that is 76% of the sum of the data sizes of the fifty stored aerial images.

It is to be understood that the operations and functionality of the AIME 1000, its constituent components, and associated processes may be achieved by any one or more of hardware-based, software-based, and firmware-based elements such as a plurality of aerial imaging systems similar to the aerial imaging system 30 operating in parallel and/or a plurality of servers similar to the server 15 operating in parallel. Such operational alternatives do not, in any way, limit the scope of the present disclosure.

It should be expressly understood that not all technical effects mentioned herein need to be enjoyed in each and every example or implementation of the present technology.

While the above-described implementations have been described and shown with reference to particular steps performed in a particular order, it will be understood that these operations may be combined, sub-divided, or re-ordered without departing from the teachings of the present technology. At least some of the steps may be executed in parallel or in series. Accordingly, the order and grouping of the steps is not a limitation of the present technology.

Modifications and improvements to the above-described implementations and examples of the present technology may become apparent to those skilled in the art. The foregoing description is intended to be exemplary rather than limiting. The scope of the present technology is therefore intended to be limited solely by the scope of the appended claims.

What is claimed is:

1. A method for storing a captured aerial image on a data storage device, the captured aerial image being associated with a corresponding captured aerial image metadata file, the method comprising:

accessing the captured aerial image and the corresponding captured aerial image metadata file, the captured aerial image metadata file comprising captured geospatial data indicative of a location of a first zone of interest imaged on the captured aerial image and of a location of a second zone of interest imaged on the captured aerial image;

selecting a first compressed file among a plurality of compressed files in response to the first zone of interest imaged on the captured aerial image overlapping at least a portion of the first zone of interest imaged on the first compressed file;

extracting a first sequence of stored aerial images from the selected first compressed file stored on the data storage device, the first sequence of stored aerial images comprising at least one stored aerial image, and the selected first compressed file being associated with a corresponding stored aerial image metadata file, the stored aerial image metadata file comprising stored geospatial data indicative of a location of a corresponding first zone of interest imaged on the selected first compressed file;

determining a first position for inserting the captured aerial image in the first sequence of stored aerial images;

updating the first sequence of stored aerial images by inserting the captured aerial image in the first sequence of stored aerial images at the first position;

after updating the first sequence of stored aerial images, encoding the selected first compressed file by applying an encoding algorithm to the first sequence of stored aerial images;

storing the selected first compressed file on the data storage device;

generating a synthesis aerial image from the captured aerial image, the synthesis aerial image comprising the second zone of interest imaged on the captured aerial image;

generating a synthesis aerial image metadata file corresponding to the synthesis aerial image;

selecting a second compressed file among the plurality of compressed files based on the synthesis aerial image metadata file;

extracting a second sequence of stored aerial images from the second compressed file;

determining a second position for inserting the synthesis aerial image in the second sequence of stored aerial images;

updating the second sequence of stored aerial images by inserting the synthesis aerial image in the second sequence of stored aerial images at the second position;

after updating the second sequence of stored aerial images, encoding the second compressed file by applying the encoding algorithm to the second sequence of stored aerial images; and storing the second compressed file on the data storage device.

2. The method of claim 1, further comprising, subsequent to extracting the first sequence of stored aerial images:

determining, based on the captured aerial image and a given stored aerial image of the first sequence of stored aerial images, a first set of coordinates of a first entity and a second set of coordinates of a second entity, the first and second entities being imaged on both of the captured aerial image and the given stored aerial image; and performing image processing operations onto the captured aerial image to form an aligned version of the captured aerial image, wherein the updating the first sequence of stored aerial images by inserting the captured aerial image in the first sequence of stored aerial images comprises inserting the aligned version of the captured aerial image.

3. The method of claim 2, wherein the image processing operations are selected in a group of operations including zooming operations, cropping operations and rotation operations.

4. The method of claim 1, wherein:

the first compressed file is a video file, each stored aerial image constitutes a frame of the video file, and the encoding algorithm is a video encoding algorithm.

5. The method of claim 4, wherein the video encoding algorithm uses a High Efficiency Video Coding (HEVC) compression standard.

6. The method of claim 1, wherein:

the first compressed file is an image file, the first compressed file comprising information of an image concatenation of a plurality of concatenated stored aerial images, and the encoding algorithm is an image encoding algorithm.

7. The method of claim 1, wherein determining the first position of the captured aerial image in the first sequence of stored aerial images comprises:

determining, for each of the at least one stored aerial image of the first sequence of stored aerial images, a similarity score indicative of a visual similarity between the captured aerial image and a corresponding stored aerial image of the first sequence of stored aerial images; and defining the first position adjacent to a given one of the stored aerial images of the first sequence of stored aerial images having the highest similarity score.

8. The method of claim 7, wherein determining the similarity score for each of the at least one stored aerial image of the first sequence of stored aerial images comprises:

accessing downgraded versions of each of the at least one stored aerial image of the sequence of stored aerial images; and for each stored aerial image of the first sequence of stored aerial images, determining the similarity score based on a visual similarity between the corresponding downgraded version and the captured aerial image.

9. The method of claim 1, wherein the data storage device is a multi-tenant data storage device communicably connected with a plurality of users, the metadata file corresponding to each compressed file of the plurality of compressed files comprising a user-related tag being indicative of an identification of a corresponding one user of the plurality of users.

10. The method of claim 9, wherein the captured aerial image metadata file comprises a first user-related tag indicative of an identification of a first user; and wherein selecting the first compressed file among the plurality of compressed files comprises:

accessing the metadata file of each compressed file of the plurality of compressed files, each metadata file comprising a user-related tag indicative of an identification of at least one user having access rights to the corresponding compressed file; and selecting the first compressed file among the plurality of compressed files based on a matching of the first user-related tag with the user-related tag of at least one compressed file among the plurality of compressed files.

11. The method of claim 10, wherein selecting the first compressed file among the plurality of compressed files comprises:

determining a first set of compressed files based on a matching of the first user-related tag with the user-related tags of the at least one compressed file; and selecting the first compressed file among the first set of compressed files.

12. The method of claim 1, further comprising, prior to extracting the first sequence from the first compressed file, selecting the first compressed file among the plurality of compressed files stored on the data storage device based on the metadata file corresponding to the captured image and on a metadata file corresponding to the first compressed file.

13. The method of claim 1, further comprising, subsequent to storing the first compressed file on the data storage device, updating a metadata file of the first compressed file based on information included in the metadata file corresponding to the captured aerial image.

14. The method of claim 1, wherein the captured aerial image is a satellite image.

15. A method for storing a captured aerial image on a data storage device that stores a plurality of compressed files and retrieving a target aerial image from the data storage device, the method comprising:

accessing the captured aerial image and a corresponding captured aerial image metadata file, the captured aerial image metadata file comprising captured geospatial data indicative of a location of a first zone of interest imaged on the captured aerial image and of a location of a second zone of interest imaged on the captured aerial image;

selecting a first compressed file among the plurality of compressed files stored on the data storage device in response to the first zone of interest imaged on the captured aerial image overlapping at least a portion of the first zone of interest imaged on the first compressed file;

extracting a first sequence of stored aerial images from the selected first compressed file stored on the data storage device, the first sequence of stored aerial images comprising at least one stored aerial image, and the selected first compressed file being associated with a corresponding stored aerial image metadata file, the stored aerial image metadata file comprising stored geospatial data indicative of a location of a corresponding first zone of interest imaged on the selected first compressed file;

determining a first position for inserting the captured aerial image in the first sequence of stored aerial images;

updating the first sequence of stored aerial images by inserting the captured aerial image in the first sequence of stored aerial images at the first position;

after updating the first sequence of stored aerial images, encoding the selected first compressed file by applying an encoding algorithm to the first sequence of stored aerial images;

storing the selected first compressed file on the data storage device;

receiving instruction from a user to retrieve a target aerial image from the data storage device, the instruction comprising an identification of a target user-related tag and a target temporal tag;

identifying a target compressed file among the plurality of compressed files stored on the data storage device based on the identification of the target user-related tag;

extracting the target aerial image from a sequence of stored aerial images of the target compressed file based on the target temporal tag; and transmitting the target aerial image to the user.

16. A method for retrieving a target aerial image from a data storage device, the data storage device storing compressed files, the method comprising:

accessing a retrieval instruction comprising an identification of:

a target user-related tag, target geospatial data, and a target time of capture of the target aerial image;

accessing the compressed files from the data storage device, each of the compressed files being a compressed form of a sequence of stored aerial images and being associated with a metadata file, the metadata file comprising:

a user-related tag indicative of an identification of at least one user having access rights, stored geospatial data indicative of a location of a corresponding zone of interest imaged, and indication of times of capture;

identifying a target compressed file from the compressed files, the identifying being based on at least one of:

a comparison of the target user-related tag with the user-related tag of each of the compressed files; and/or a comparison of the target geospatial data and the stored geospatial data of each of the compressed files;

applying a decoding algorithm onto the target compressed file to extract the sequence of stored aerial images from the target compressed file;

identifying the target aerial image among the stored aerial images of the sequence based on a comparison of the target time of capture and times of capture of the stored aerial images; and returning the target aerial image.

17. A system for storing a captured aerial image on a data storage device, the captured aerial image being associated with a corresponding metadata file, the system comprising a controller and a memory storing a plurality of executable instructions which, when executed by the controller, cause the system to execute the method of claim 1.

18. A system for retrieving a target aerial image from a data storage device, the system comprising a controller and a memory storing a plurality of executable instructions which, when executed by the controller, cause the system to execute the method of claim 16.

* * * * *